United States Patent
Yum et al.

(10) Patent No.: US 10,693,612 B2
(45) Date of Patent: Jun. 23, 2020

(54) METHOD AND APPARATUS FOR RECEIVING OR TRANSMITTING DOWNLINK SIGNAL IN WIRELESS COMMUNICATION SYSTEM

(71) Applicant: LG Electronics Inc., Seoul (KR)

(72) Inventors: Kunil Yum, Seoul (KR); Jiwon Kang, Seoul (KR); Kijun Kim, Seoul (KR); Hyungtae Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,733

(22) PCT Filed: Jun. 7, 2018

(86) PCT No.: PCT/KR2018/006464
§ 371 (c)(1),
(2) Date: Dec. 18, 2018

(87) PCT Pub. No.: WO2018/226039
PCT Pub. Date: Dec. 13, 2018

(65) Prior Publication Data
US 2020/0092062 A1    Mar. 19, 2020

Related U.S. Application Data

(60) Provisional application No. 62/559,632, filed on Sep. 17, 2017, provisional application No. 62/541,110, (Continued)

(51) Int. Cl.
*H04L 5/00*    (2006.01)
*H04W 72/04*   (2009.01)
(Continued)

(52) U.S. Cl.
CPC ......... *H04L 5/0053* (2013.01); *H04L 1/1614* (2013.01); *H04L 1/1861* (2013.01); *H04L 5/0048* (2013.01); *H04W 72/042* (2013.01)

(58) Field of Classification Search
None
See application file for complete search history.

(56) References Cited

U.S. PATENT DOCUMENTS

2013/0301550 A1   11/2013 Kim et al.
2015/0256307 A1    9/2015 Nagata et al.
(Continued)

FOREIGN PATENT DOCUMENTS

KR   1020010036299   5/2001
KR   1020140005844   1/2014
(Continued)

OTHER PUBLICATIONS

Qualcomm Incorporated, "A comprehensive rate-matching scheme for polar codes and performance evaluation," R1-1706675, 3GPP TSG-RAN WG1 #88b, Apr. 3-7, 2017 Spokane, USA, 9 pages.
(Continued)

*Primary Examiner* — Anh Vu H Ly
(74) *Attorney, Agent, or Firm* — Fish & Richardson P.C.

(57) ABSTRACT

According to one embodiment of the present invention, a method of decoding, by a user equipment, a downlink signal in a wireless communication system comprises the steps of: receiving rate matching pattern information indicating a rate matching resource having a repetition period from a base station; and decoding a downlink shared channel using the rate matching pattern information.

12 Claims, 22 Drawing Sheets

Related U.S. Application Data filed on Aug. 4, 2017, provisional application No. 62/523,788, filed on Jun. 23, 2017, provisional application No. 62/520,527, filed on Jun. 15, 2017, provisional application No. 62/517,182, filed on Jun. 9, 2017.

(51) Int. Cl.
*H04L 1/18* (2006.01)
*H04L 1/16* (2006.01)

(56) References Cited

U.S. PATENT DOCUMENTS

| | | | | |
|---|---|---|---|---|
| 2016/0183167 A1* | 6/2016 | Agiwal | ............... | H04W 48/16 |
| | | | | 370/329 |
| 2016/0242203 A1* | 8/2016 | You | ............... | H04L 5/0053 |
| | | | | 370/329 |
| 2017/0070312 A1* | 3/2017 | Yi | ............... | H04J 11/0069 |
| | | | | 370/329 |
| 2018/0091280 A1* | 3/2018 | Kim | ............... | H04W 72/082 |
| | | | | 370/329 |
| 2018/0375710 A1* | 12/2018 | Chae | ............... | H04W 4/70 |
| | | | | 370/329 |
| 2019/0021131 A1* | 1/2019 | Zhang | ............... | H04L 5/003 |
| | | | | 370/329 |
| 2019/0191461 A1* | 6/2019 | Lee | ............... | H04W 8/005 |
| | | | | 370/329 |
| 2019/0387508 A1* | 12/2019 | Park | ............... | H04L 27/2607 |
| | | | | 370/329 |
| 2019/0387557 A1* | 12/2019 | Cai | ............... | H04L 69/22 |
| | | | | 370/329 |

FOREIGN PATENT DOCUMENTS

| | | |
|---|---|---|
| KR | 102150030661 | 3/2015 |
| KR | 1020150044888 | 4/2015 |
| KR | 20160132975 | 11/2016 |
| KR | 1020160131944 | 11/2016 |
| WO | WO2013138810 | 9/2013 |
| WO | WO2016117984 | 7/2016 |
| WO | WO2016122242 | 8/2016 |

OTHER PUBLICATIONS

LG Electronics, "Discussion on rate matching for NR-PDSCH and NR-PUSCH," 3GPP TSG RAN WG1 Meeting #89, May 15-19, 2017.
Panasonic, "ZP CSI-RS for PDSCH rate matching," 3GPP TSG-RAN WG1 Meeting #89, May 15-19, 2017.
Extended European Search Report in European Application No. 18813809.3, dated Jan. 17, 2020, 8 pages.
Korean Notice of Allowance in Korean Application No. 10-2019-0003236, dated Dec. 23, 2019, 3 pages (with English translation).
LG Electronics, "Discussion on interference measurement and rate matching for NR," R1-1707608, 3GPP TSG RAN WG1 Meeting #89, Hangzhou, P.R. China, dated May 15-19, 2017, 6 pages.
ZTE, Sanechips, "About dynamic resource sharing," R1-1719495, 3GPP TSG RAN1 Meeting 91, Reno, USA, dated Nov. 27-Dec. 1, 2017, 5 pages.

\* cited by examiner

2 RE element        1 RE element

FIG. 12
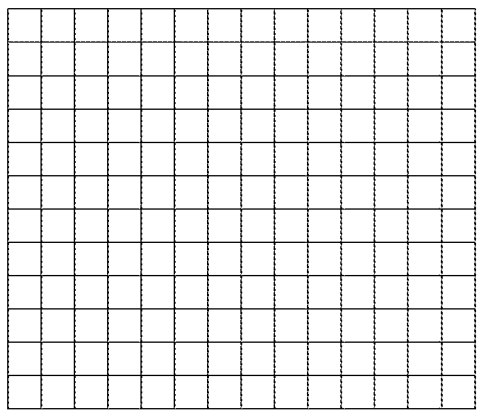
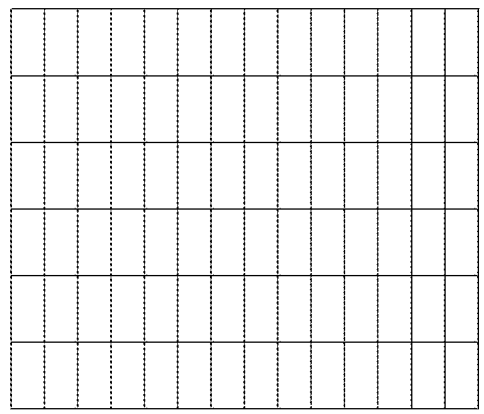
(a) 1 RE resource grid element     (b) 2 RE resource grid element FIG. 13
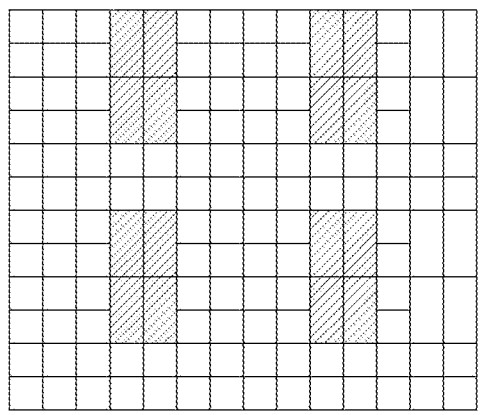

FIG. 14
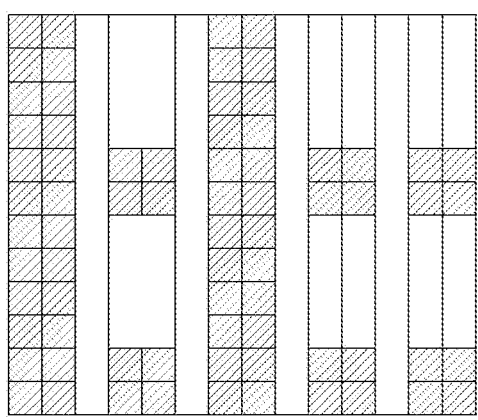
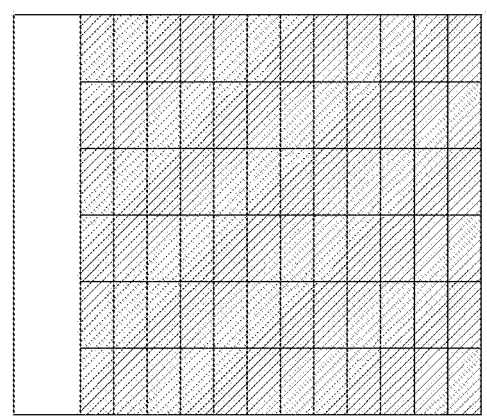
(a)　　　　　　　　　　　(b)

METHOD AND APPARATUS FOR RECEIVING OR TRANSMITTING DOWNLINK SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2018/006464, filed on Jun. 7, 2018, which claims the benefit of U.S. Provisional Application No. 62/559,632, filed on Sep. 17, 2017, U.S. Provisional Application No. 62/541,110, filed on Aug. 4, 2017, U.S. Provisional Application No. 62/523,788, filed on Jun. 23, 2017, U.S. Provisional Application No. 62/520,527, filed on Jun. 15, 2017, and U.S. Provisional Application No. 62/517,182, filed on Jun. 9, 2017. The disclosures of the prior applications are incorporated by reference in their entirety.

TECHNICAL FIELD

The present invention relates to a wireless communication system, and more particularly, to a method of receiving or transmitting a downlink signal in a wireless communication system and an apparatus therefor.

BACKGROUND ART

As more communication devices require greater communication traffic, necessity for a mobile broadband communication, which is enhanced compared to a legacy radio access technology (RAT), is emerging. Massive MTC (machine type communication) providing a user with various services anywhere and at any time by connecting many devices and objects is one of important issues to be considered in the next generation communication system. Moreover, discussion on designing a communication system in consideration of a service sensitive to reliability and latency is in progress. In particular, discussion on the introduction of a next generation RAT considering eMBB (enhanced mobile broadband communication), massive MTC (mMTC), URLLC (ultra-reliable and low latency communication), and the like is in progress. In the present invention, for clarity, the next generation RAT is referred to as a New RAT.

DISCLOSURE OF THE INVENTION

Technical Task

A technical task of the present invention is to provide a method of receiving or transmitting a downlink signal. More specifically, a technical task of the present invention is to provide a method of receiving or transmitting a configuration related to rate matching of a base station or a user equipment, a method of signaling the configuration, and a method of receiving or transmitting a downlink signal based on the signaling.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of decoding a downlink signal, the method being performed by a terminal in a wireless communication system, includes receiving rate matching pattern information indicating a rate matching resource having a repetition period from a base station, and decoding a downlink shared channel using the rate matching pattern information.

Additionally or alternatively, the rate matching pattern information may include a first bitmap indicating a frequency resource region, a second bitmap indicating a time resource region, and a third bitmap indicating one or more time units to which a rate matching pattern indicated by the first bitmap and the second bitmap is configured among a plurality of time units within the repetition period.

Additionally or alternatively, the method may further include performing rate matching on the rate matching resource.

Additionally or alternatively, the second bitmap may indicate each of consecutive symbols within a predetermined resource unit.

Additionally or alternatively, the rate matching pattern information may be used only in a region for the downlink shared channel.

Additionally or alternatively, the region for the downlink shared channel may be configured by a signal indicating a starting symbol of the downlink shared channel or an ending symbol of the downlink shared channel.

To further achieve these and other advantages and in accordance with the purpose of the present invention, according to a different embodiment, a method of transmitting a downlink signal, the method being performed by a base station in a wireless communication system, includes transmitting rate matching pattern information indicating a rate matching resource having a repetition period to a user equipment, performing resource element mapping for a downlink shared channel based on the rate matching pattern information, and transmitting the downlink shared channel.

Additionally or alternatively, the rate matching pattern information may include a first bitmap indicating a frequency resource region, a second bitmap indicating a time resource region, and a third bitmap indicating one or more time units to which a rate matching pattern indicated by the first bitmap and the second bitmap is configured among a plurality of time units within the repetition period.

Additionally or alternatively, rate matching may be performed on the rate matching resource.

Additionally or alternatively, the second bitmap may indicate each of consecutive symbols within a predetermined resource unit.

Additionally or alternatively, the rate matching pattern information may be used only in a region for the downlink shared channel.

Additionally or alternatively, the region for the downlink shared channel may be configured by a signal indicating a starting symbol of the downlink shared channel starting symbol or an ending symbol of the downlink shared channel.

To further achieve these and other advantages and in accordance with the purpose of the present invention, according to a further different embodiment, a terminal for decoding a downlink signal in a wireless communication system includes a transmitter and a receiver, and a processor that controls the transmitter and the receiver, the processor controls the receiver to receive rate matching pattern information indicating a rate matching resource having a repetition period from a base station, and decodes a downlink shared channel using the rate matching pattern information.

Additionally or alternatively, the rate matching pattern information may include a first bitmap indicating a frequency resource region, a second bitmap indicating a time resource region, and a third bitmap indicating one or more time units to which a rate matching pattern indicated by the first bitmap and the second bitmap is configured among a plurality of time units within the repetition period.

To further achieve these and other advantages and in accordance with the purpose of the present invention, according to a further different embodiment, a base station for transmitting a downlink signal in a wireless communication system includes a transmitter and a receiver, and a processor that controls the transmitter and the receiver, the processor transmits rate matching pattern information indicating a rate matching resource having a repetition period to a user equipment, and performs resource element mapping for a downlink shared channel based on the rate matching pattern information, and transmits the downlink shared channel.

Additionally or alternatively, the rate matching pattern information may include a first bitmap indicating a frequency resource region, a second bitmap indicating a time resource region, and a third bitmap indicating one or more time units to which a rate matching pattern indicated by the first bitmap and the second bitmap is configured among a plurality of time units within the repetition period.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to the present invention, it is able to efficiently perform downlink reception.

Effects obtainable from the present invention may be non-limited by the above mentioned effect. And, other unmentioned effects can be clearly understood from the following description by those having ordinary skill in the technical field to which the present invention pertains

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 12 illustrates 1-RE resource grid element size and 2-RE resource grid element size;

FIG. 13 illustrates a resource grid element configuration configured in two regions within a slot;

FIG. 14 illustrates an RM resource grid according to a different resource grid element size;

BEST MODE

Mode for Invention

Figure 1:
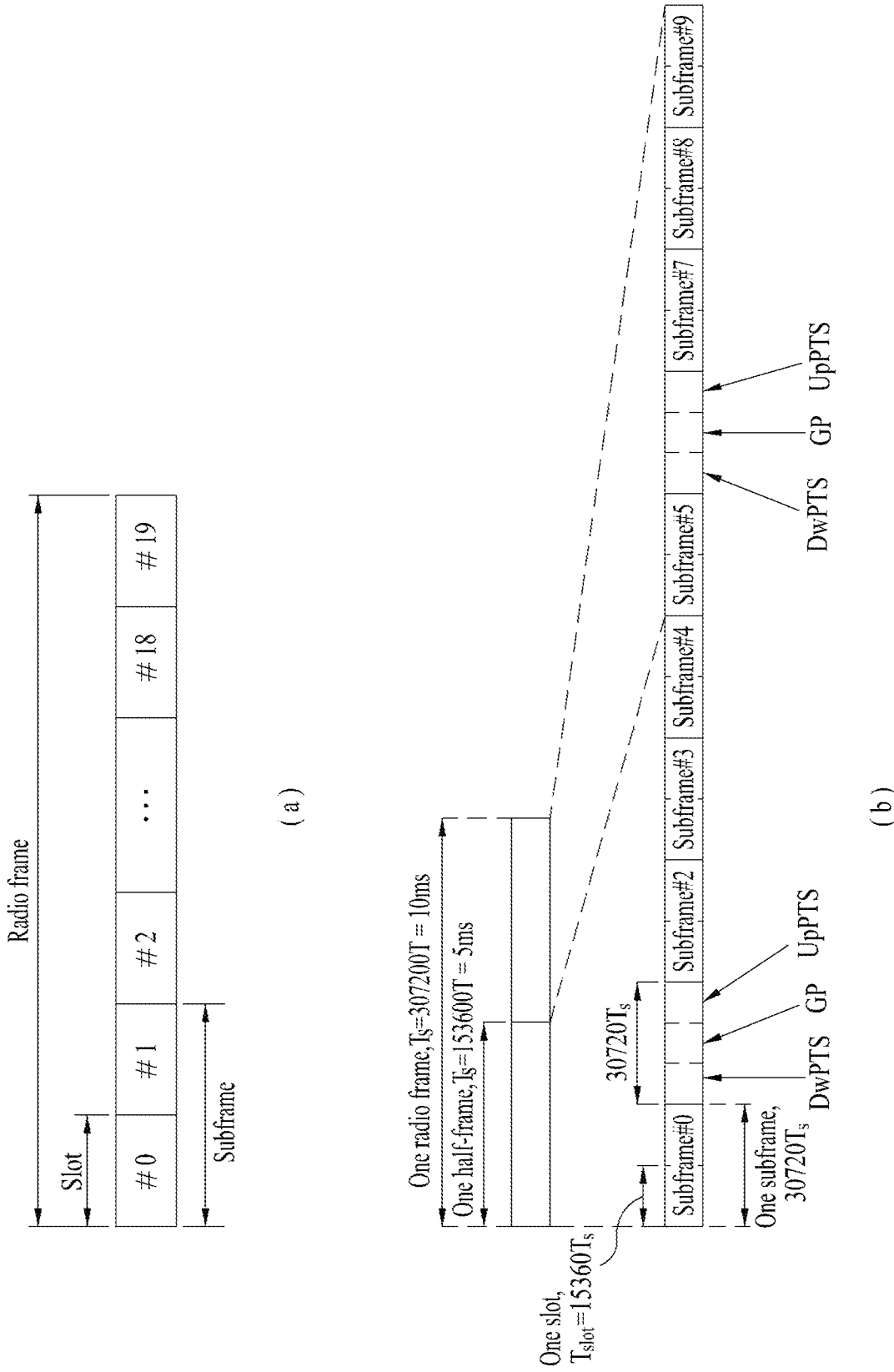
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configu-ration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special sub-frame config-uration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
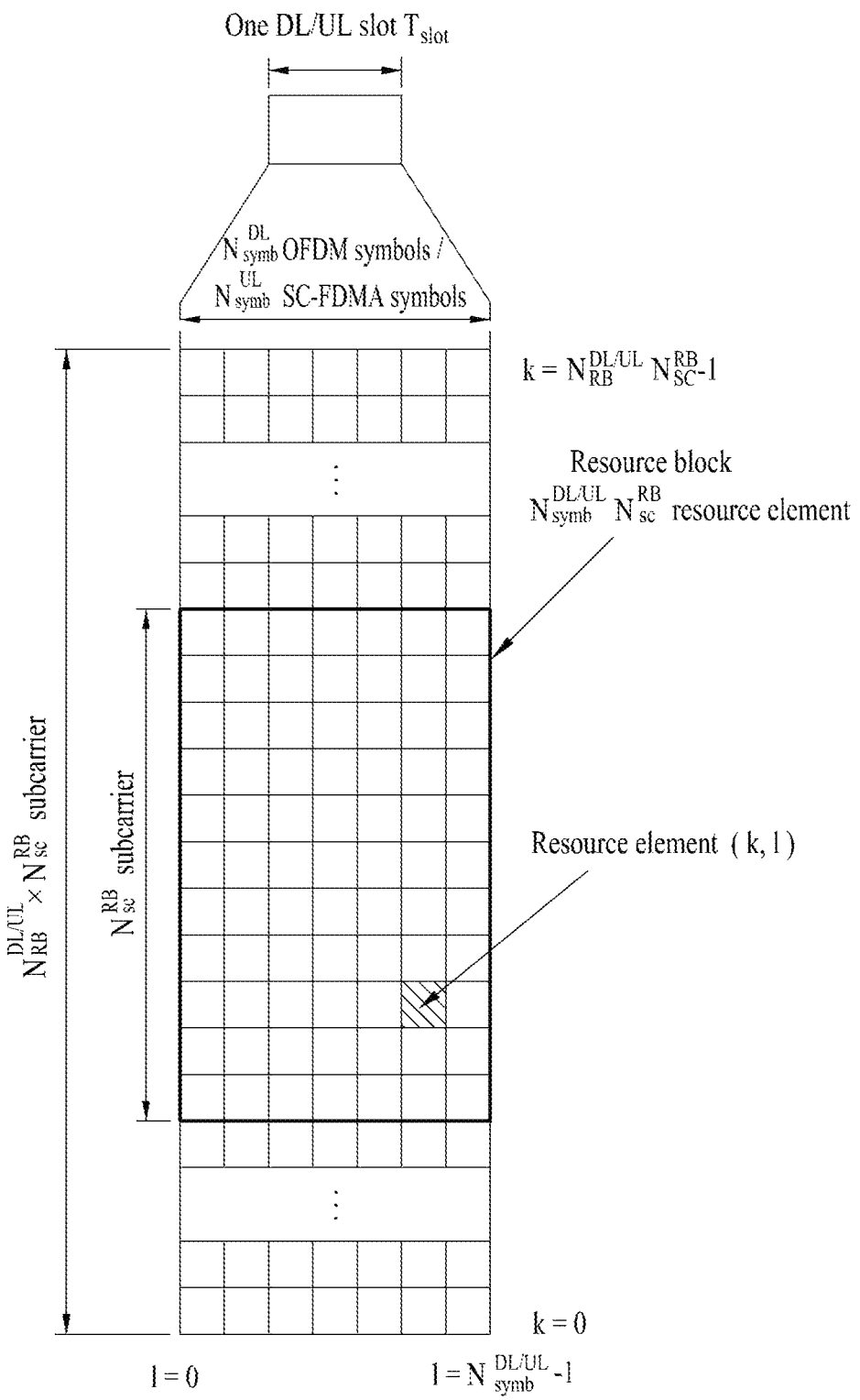
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone.

Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to VB $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
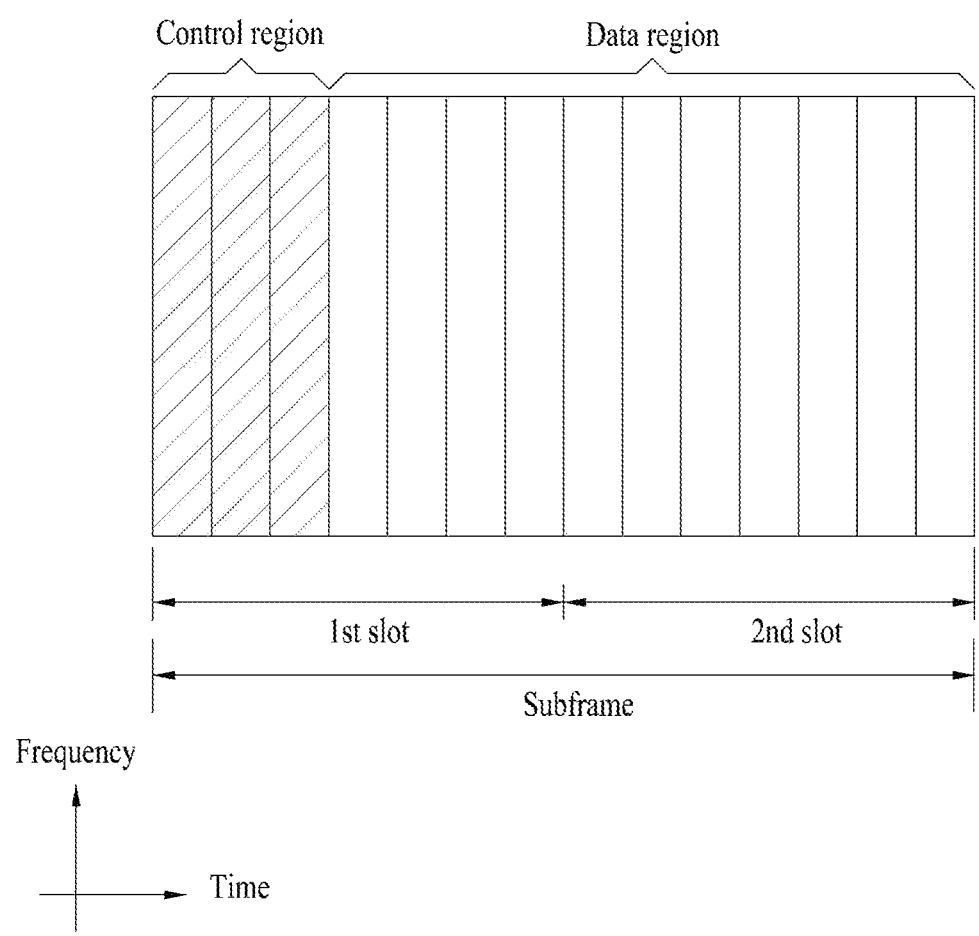
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
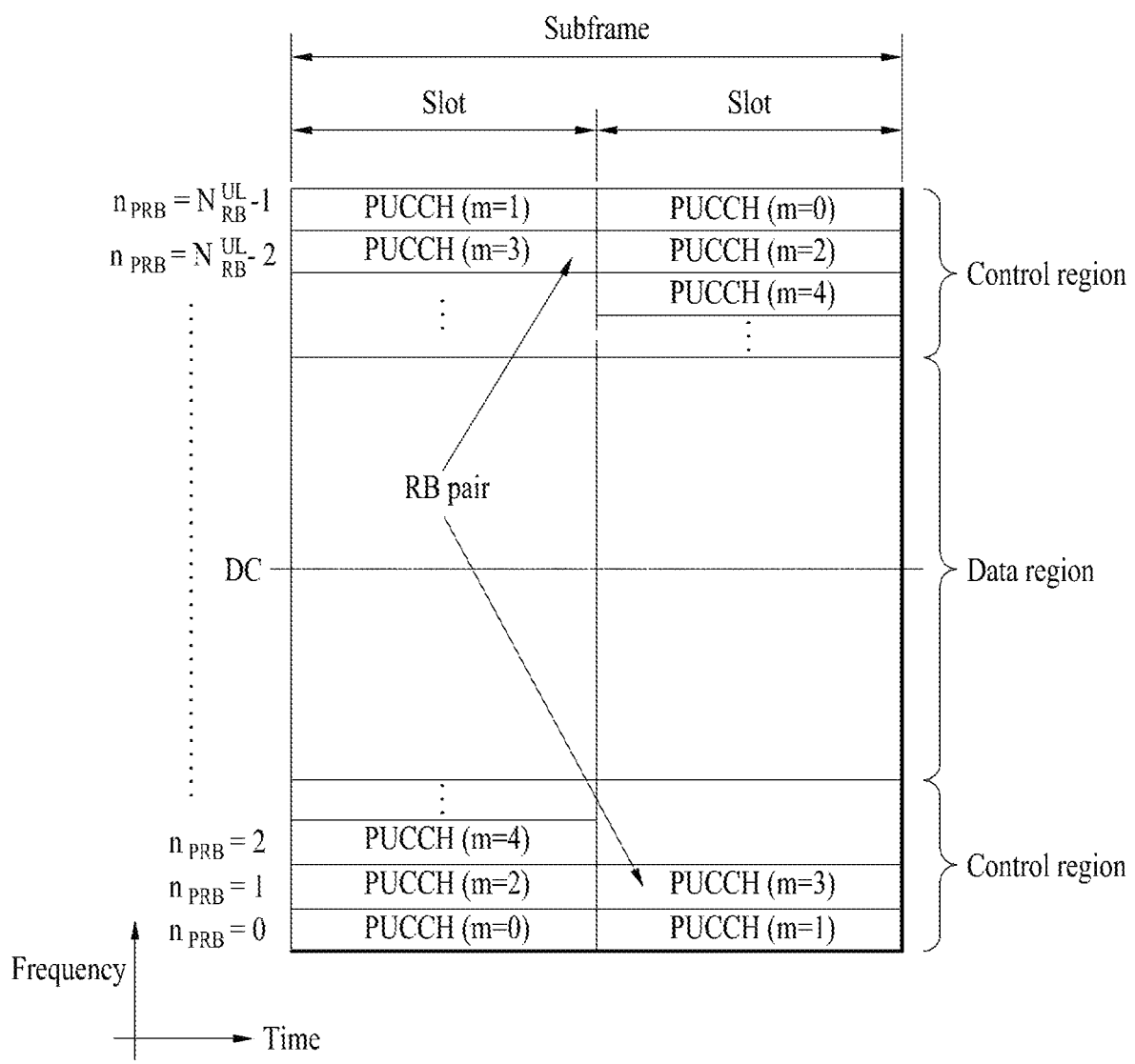
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

NR (New Radio Technology)

Although the structure, operation or function of the 3GPP LTE (-A) system has been described in the above description, the structure, operation, or function in the 3GPP LTE (-A) in the NR is slightly modified, Can be set. Let me briefly explain some of them.

In NR, various numerology (numerology) are supported. For example, subcarrier spacing (subcarrier spacing) is supported not only at 15 KHz, but also up to 2n times (n=1, 2, 3, 4).

The number of OFDM symbols per slot (hereinafter simply referred to as "symbol") is fixed to 14, but the number of slots in one subframe is 2k (k=0, 1, 2, 3, 4, 5).

However, it is the same as the existing LTE system that the radio frame is composed of 10 subframes. In case of extended CP, the number of symbols per slot is fixed to 12, and one subframe consists of 4 slots. In addition, like the existing LTE system, one resource block is defined as 12 consecutive subcarriers in the frequency domain.

Also, the purpose (for example, downlink, uplink, or flexible) of each symbol in a slot is defined according to the slot format, and both the downlink symbol and the uplink symbol can be set in one slot, And this case is referred to as a self-contained subframe (or slot) structure.

In FD-MIMO of LTE and MIMO of New RAT, discussion on an aperiodic CSI-RS (A-CSIRS) is in progress. The A-CSIRS corresponds to a CSI-RS transmitted at specific timing (e.g., a subframe, a slot, etc.). The A-CSIRS informs a UE of the timing at which the A-CSIRS is transmitted via DCI to make the UE use a corresponding RS for measuring CSI. In particular, when the A-CSIRS is transmitted, it is necessary to consider a method of transmitting a data symbol which is transmitted at time/position at which a corresponding RS is transmitted.

A scheme used in LTE corresponds to a scheme of using rate-matching (RM). In particular, when rate matching is performed on a data symbol in an A-CSIRS RE, operations of a base station (BS) and a user equipment (UE) are described in the following. When the BS performs mapping on an RE of PDSCH, the BS sets a zero-power (ZP) CSI-RS (ZP-CSI-RS) including an RE pattern of an RS transmitting an A-CSIRS to the UE. The BS performs RE mapping under the assumption that PDSCH is not transmitted in a ZP-CSI-RS RE and may be then able to transmit PDSCH. And, the BS transmits A-CSIRS to an A-CSIRS RE. The UE performs decoding on the PDSCH by assuming the transmission operation of the BS. In particular, the UE performs decoding under the assumption that PDSCH is not mapped to a PDSCH muting RE to which a ZP-CSI-RS is set from the beginning.

A semi-persistent (SP) CSI-RS (SP-CSI-RS) is also considered in the FD-MIMO of LTE and the MIMO of New RAT. Similar to the A-CSIRS, the SP-CSIRS uses a method of transmitting a CSI-RS in a prescribed time period via enable/disable signaling and has a characteristic that whether or not a CSI-RS is transmitted varies according to timing.

In order to use the scheme above, it is necessary for a base station and a UE to have signaling and configuration for using rate matching. In particular, since it is able to dynamically transmit the A-CSIRS in every subframe, it is necessary to have dynamic signaling (e.g., signaling such as DCI via PDCCH) corresponding to the A-CSIRS and a ZP-CSI-RS configuration via higher layer signaling for the A-CSIRS. In the following, 'rate matching' can be simply referred to as 'RM'. And, a ZP CSI-RS or an NZP CSI-RS may corresponds to a resource in which 'CSI-RS' is transmitted or may correspond to both a CSI-RS and a resource in which the CSI-RS is transmitted.

ZP-CSI-RS Configuration Method for Rate-Matching

For the aforementioned rate matching signaling, it may be able to define a configuration described in the following and the configuration can be set to a base station and a user equipment.

1. Configuration of 'Rate Matching Setting'

Option 1: A rate matching setting corresponds to a set of the 'L number of links' designating a ZP-CSI-RS (or a resource group) to be used for performing rate matching in a 'resource setting' shared with a measurement setting for CSI acquisition and/or beam management frame work. FIG.

5 illustrates a rate matching setting having a sharing resource setting with a ZP-CSI-RS resource.

Figure 5:
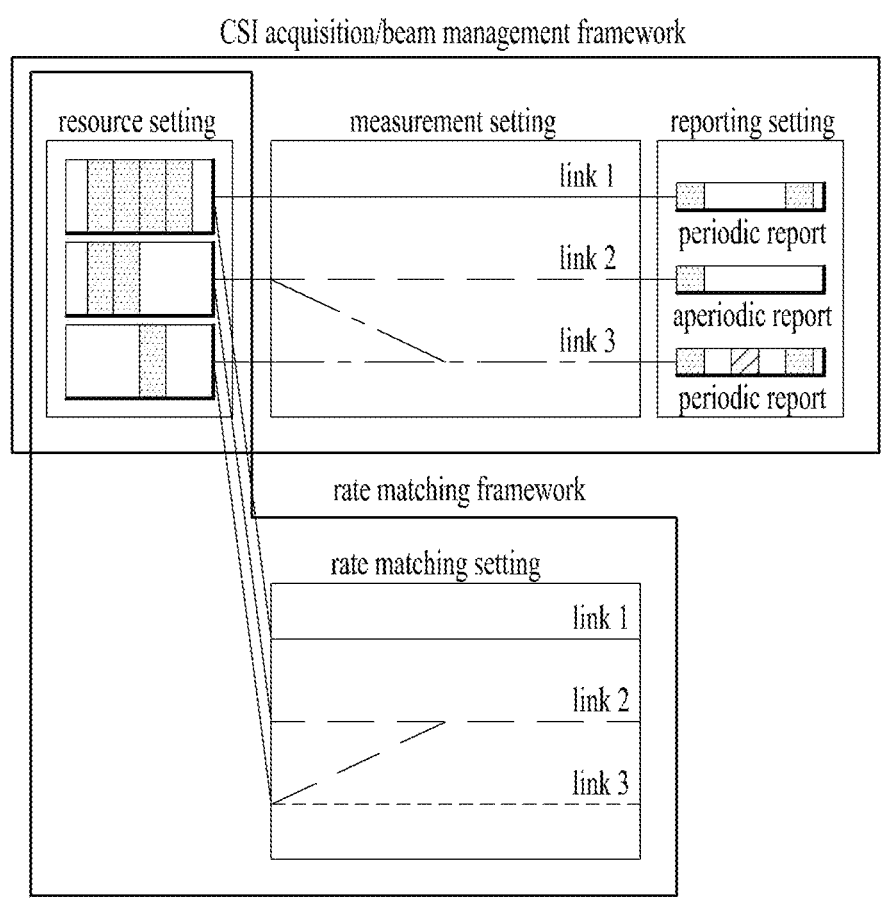
FIG. 5 illustrates a rate matching setting having a sharing resource setting with a ZP-CSI-RS resource.

In FIG. 5, each link corresponds to a ZP-CSI-RS resource group. In particular, a plurality of resource settings can be set to each link as a rate matching pattern (refer to link 2 of the 'rate matching setting' of FIG. 5). In this case, an actually applied ZP-CSI-RS RE pattern corresponds to a union of a plurality of configured ZP-CSI-RS resource RE patterns.

A resource setting corresponds to a set of RS RE pattern candidates for ZP-CSI-RS. Each resource setting can include a different type of an RS (e.g., DMRS, SRS, etc.). For the resource setting, it may reuse an RS RE pattern for NZP-CSI-RS defined for the CSI acquisition and/or beam management framework. In this case, although the NZP-CSI-RS is used, if a resource is linked in the rate matching setting, a base station and a UE automatically interpret the resource as a ZP-CSI-RS.

Figure 6:
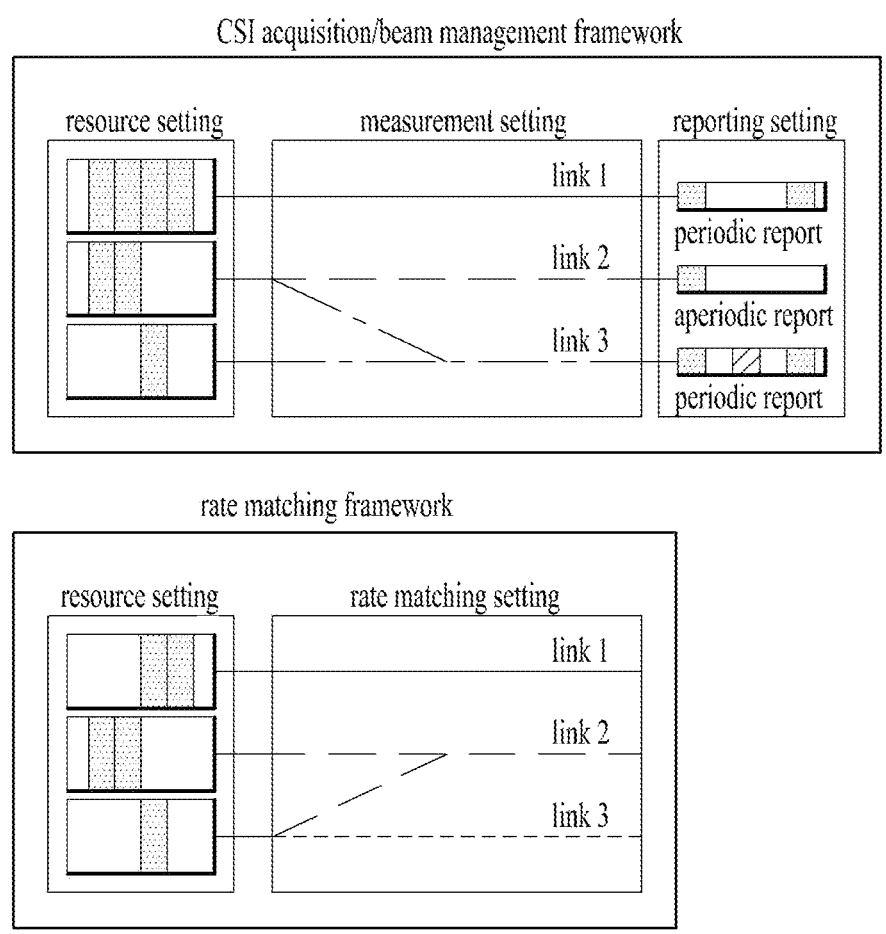
FIG. 6 illustrates a rate matching setting having a resource setting independent of a ZP-CSI-RS resource configuration.

Option 2: A rate matching setting corresponds to a set of the 'L number of links' designating a ZP-CSI-RS (or a resource group) to be used for performing rate matching in a 'resource setting' configured irrespective of a measurement setting for CSI acquisition and/or beam management frame work. FIG. 6 illustrates a rate matching setting having a resource setting independent of a ZP-CSI-RS resource configuration.

In FIG. 6, each link corresponds to a ZP-CSI-RS resource group. In particular, a plurality of resource settings can be set to each link as a rate matching pattern (refer to link 2 of the 'rate matching setting' of FIG. 6). In this case, an actually applied ZP-CSI-RS RE pattern corresponds to a union of a plurality of configured ZP-CSI-RS resource RE patterns.

A resource setting corresponds to a set of RS RE pattern candidates for ZP-CSI-RS. Each resource setting can include a different type of an RS (e.g., DMRS, SRS, etc.). The resource setting includes the M (M>=1) number of candidate ZP-CSI-RS patterns.

In particular, for clarity of configuration and signaling (e.g., in order to reduce overhead), it may be able to define a ZP-CSI-RS pattern for performing RM using a part of available CSI-RE RE pattern candidates only. In particular, a resource setting for rate matching can include all or a part of available CSI-RE RE patterns. For example, a ZP-CSI-RS RE pattern can include a pattern assuming the specific number of antenna ports (e.g., 4 ports) only among CSI-RS patterns.

The resource setting can be forwarded to the UE via higher layer signaling such as RRC.

Other Configurations:

A frequency granularity configuration (i.e., wideband/partial band/subband) can be included in each link. In the present specification, the frequency granularity corresponds to a unit of frequency allocation. For example, if the frequency granularity is configured by a wideband, frequency allocation corresponds to the x number of resource blocks. If the frequency granularity is configured by a partial band, frequency allocation corresponds to the y number of resource blocks. If the frequency granularity is configured by a subband, frequency allocation may correspond to the z number of resource blocks. In this case, x>y>z and the x, the y and the z correspond to integers. In general, the frequency granularity may correspond to a unit of frequency allocation for a single UE in a serving cell. A data, a signal, and the like can be transmitted by a base station or a serving cell within the aforementioned number of resource blocks. Moreover, the frequency granularity can be comprehended as a unit of frequency allocation different from the aforementioned frequency allocation or a unit of frequency domain.

In particular, it may be able to configure a resource having a plurality of frequency configurations different from each other. For example, it may be able to configure a wideband ZP-CSI-RS resource and a partial band ZP-CSI-RS resource.

If an additional frequency granularity-related configuration is not provided, a base station and a UE follow a frequency granularity included in a designated ZP-CSI-RS RE pattern. If a frequency granularity is not included in the ZP-CSI-RS RE pattern, the UE can perform data transmission and reception under the assumption that rate matching is performed on all scheduled bands.

A time configuration (i.e., aperiodic/semi-periodic/periodic) can be included in each link.

More specifically, an aperiodic/semi-periodic/periodic ZP-CSI-RS can be comprehended as follows.

Aperiodic ZP-CSI-RS: an aperiodic ZP-CSI-RS is indicated to a UE via L1 signaling such as DCI. Rate matching can be performed on a corresponding resource pattern in a slot to which the L1 signaling is transmitted or a specific slot(s) designated by the L1 signaling only.

In this case, aperiodic ZP-CSI-RS signaling via DCI can designates a semi-persistent ZP-CSI-RS resource or a periodic ZP-CSI-RS resource (i.e., a configuration or a setting to which a period/offset is set). In this case, it may ignore a configured period/offset.

Semi-persistent ZP CSI-RS: A semi-persistent ZP CSI-RS enables/disables a rate matching operation on a resource(s) designated via L1 and/or L2 signaling among ZP CSI-RS resource(s) designated via L2 and/or L3 signaling. In this case, it may perform rate matching on a corresponding resource with a designated period/offset during the rate matching operation is enabled.

Periodic ZP-CSI-RS: A periodic ZP-CSI-RS is similar to the semi-persistent ZP-CSI-RS. However, separate enable/disable signaling does not exist in the periodic ZP-CSI-RS. The periodic ZP-CSI-RS operates as if a rate matching operation is always enabled.

In particular, it may be able to configure a resource having a plurality of time configurations different from each other. For example, it may be able to configure an aperiodic ZP-CSI-RS resource and a semi-persistent ZP-CSI-RS resource.

2. Case that Rate Matching Setting is Included in Measurement Setting

A ZP-CSI-RS link is configured under a framework of a measurement setting for CSI acquisition and/or beam management framework.

Figure 7:
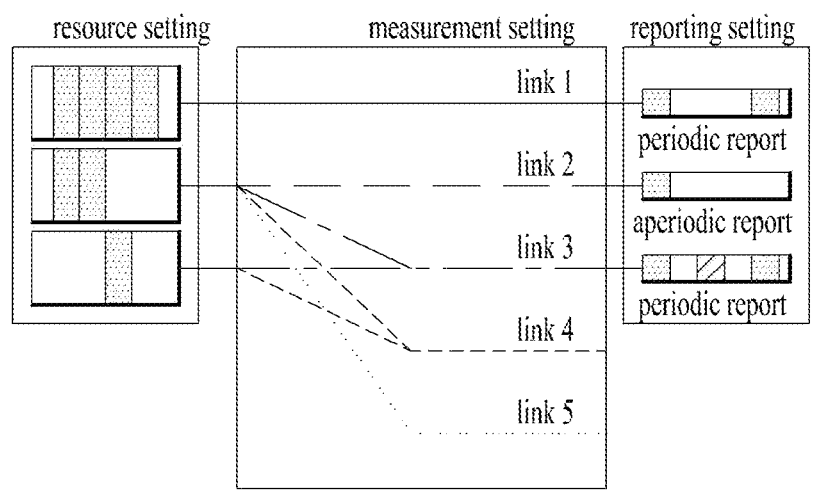
FIG. 7 illustrates a ZP-CSI-RS configuration for performing rate matching included in a measurement setting.

A resource setting corresponds to a set of RS RE pattern candidates for the entire CSI-RSs (NZP and/or ZP CSI-RS). A different type of RS pattern (e.g., DMRS, SRS, etc.) can be included in the resource setting. When a link is configured for a ZP-CSI-RS, it may reuse an RS RE pattern for an NZP-CSI-RS, which is defined for CSI acquisition and/or beam management frame work. In this case, although the NZP-CSI-RS is used, if a resource is linked in the rate matching setting, a base station and a UE can automatically interpret the resource as a ZP-CSI-RS. FIG. 7 illustrates a ZP-CSI-RS configuration for performing rate matching included in a measurement setting.

Similar to a link 4 or a link 5 of FIG. 7, if a reporting setting is not linked with a specific resource setting or a separately configured 'rate matching setting' rather than the reporting setting is linked with the specific resource setting in a measurement setting, a CSI-RS resource (or resource group) designated by the link can be comprehended as a ZP-CSI-RS pattern dedicated for rate matching. In this case, a link for performing rate matching can share an index of the link with a link for performing CSI measurement/beam management within the measurement setting.

3. Case that Rate Matching Setting is Included in Measurement Setting Having Individual Resource Setting Although the present case is similar to the aforementioned case that a rate matching setting is included in a measurement setting, according to the present case, it is able to configure a separate resource setting for a ZP CSI-RS for performing rate matching.

In this case, the entire PDSCH region as well as a set of RSs may become a target.

Figure 8:
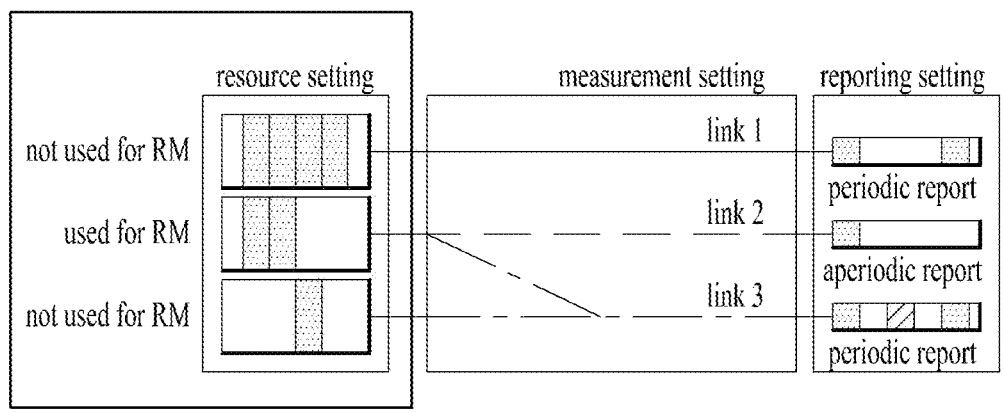
FIG. 8 illustrates an example of allocating a rate matching setting to a resource setting.

4. Case that Rate Matching Setting is Included in Resource Setting 1-bit indicator is allocated according to a resource (set) included in a resource setting to configure whether or not the resource setting is used for rate matching. FIG. 8 illustrates an example of allocating a rate matching setting (i.e., an indicator indicating whether or not a resource setting is used for rate matching) to a resource setting.

A UE assumes that rate matching is performed on all resources (or resource set) of which 1-bit indicator set to a resource setting is configured by 'RM on'.

The indicator can be commonly set to a ZP-CSI-RS and an NZP CSI-RS. Both the ZP-CSI-RS and the NZP CSI-RS can be used as a rate matching pattern.

In order to avoid transmitting data to an RE in which NZP-CSI-RS is transmitted, the indicator can be configured to be used for ZP-CSI-RS only. A UE or a base station can be configured to perform rate matching on the NZP-CSI-RS by default. In particular, the NZP-CSI-RS on which the rate matching is performed by default can be restricted to an NZP-CSI-RS resource included in a link configured to perform beam management/CSI acquisition among NZP-CSI RS resources.

More specifically, a UE or a base station can perform rate matching on both an NZP CSI-RS configured to measure a channel and an NZP CSI-RS configured to measure interference by default.

For the flexibility of interference measurement, when an NZP CSI-RS is configured to measure interference, if there is no additional signaling/configuration, a UE or a base station may not perform rate matching.

In this case, a time/frequency-related configuration may follow a corresponding NZP-CSI RS configuration.

In order to use an NZP-CSI-RS for performing rate matching, it may use a separate time/frequency configuration. In this case, it may use a higher unit (e.g., aperiodic→semi-persistent→periodic, partial band→wideband). To this end, it may use a separate indicator. For example, if 1-bit indicator is included in an NZP-CSI-RS, the indicator can be comprehended as a 'cell-specific CSI-RS resource'. Since all UEs belonging to a cell are able to use the indicator for the purpose of channel measurement and the like, a UE may operate under the assumption that NZP-CSI-RS is always transmitted to a corresponding resource. In particular, if the indicator indicates 'on', a corresponding resource can be comprehended as a semi-persistent/periodic ZP-CSI-RS irrespective of a time configuration for an NZP-CSI-RS. A UE or a base station can perform rate matching on the NZP-CSI-RS.

Method of Configuring Resource Pattern for ZP-CSI-RS to Perform Rate Matching

1. A Resource Pattern is Configured According to a Resource Configuration Method of a Different RS.

One of objects for performing RM is to protect an NZP CSI-RS. Hence, a method of configuring an RM resource may basically use a resource configuration method of a CSI-RS.

To this end, it may define component RM resources and may be able to configure a resource on which RM is to be performed by aggregating the component RM resources. For example, since it is able to define an RMR to protect a CSI-RS, it is able to define a component RM resource having an RE configuration identical to an RE configuration of a component CSI-RS resource(s) for a CSI-RS.

In this case, a component RM resource for an RMR can support a partial form or a specific form only among all component CSI-RS resources. For example, since a component RM resource is considered to be used as an IMR, the component RM resource may have a resource unit (e.g., 2 REs) identical to the minimum unit of the IMR. As a different example, among component CSI-RS resource patterns consisting of 2 REs, it may use such a pattern as 2*1. In other word, it may use a pattern that two subcarriers adjacent to each other are used in a symbol. This pattern is appropriate for performing an operation of protecting such an RS as a CSI-RS for managing a beam (i.e., a CSI-RS defined in the random number of symbols).

Figure 9:
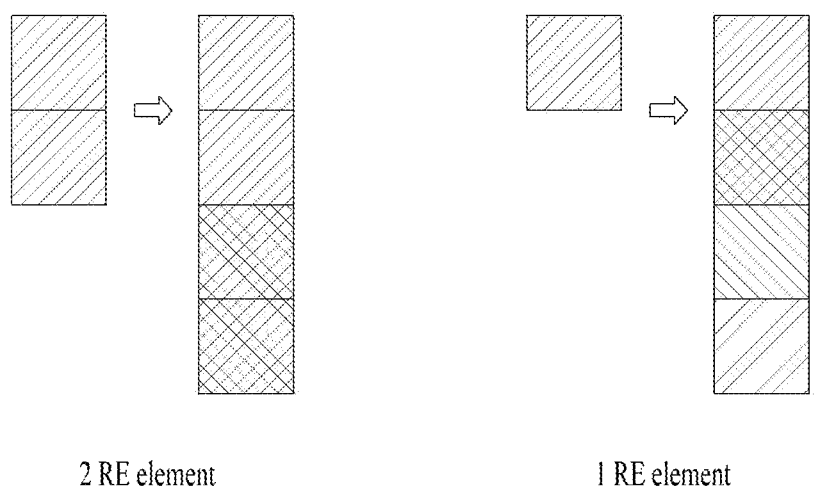
FIG. 9 illustrates an example of a component RM resource.

When two or more component RM resources are defined, it may be able to configure a resource to be used (e.g., a resource length and/or RE position (e.g., direction)) among the component RM resources. For example, as shown in FIG. 9, it may be able to configure a component RM resource to be used among 1-RE component RM resource and 2-RE component RM resource. When an RM operation is supported for an RS such as a PT (phase tracking)-RS, since the PT-RS is transmitted in every symbol or alternating symbol using 1 subcarrier in frequency direction, it may be able to use the component RM resource.

If a CSI-RS does not use 1-RE component resource, it may use a principle identical to a principle of aggregating 2-RE component resources.

If component RM resources are aggregated, an RMR can be extended in a unit of a component resource in an order determined according to a configured port number. In this case, the order can include a position to which a component resource is assigned for a single RMR. Unlike a different RS, since an RMR does not need a port concept, a port number parameter set to the RMR may correspond to a size (e.g., number of REs) of a resource at which the RMR is defined. Or, it may define a different parameter having the same meaning.

If it is able to define a CSI-RS at a plurality of symbol locations, it may be able to configure a 'symbol location' capable of configuring a location of an RMR in a slot (e.g., a location of a first symbol of the RMR). The symbol location can be configured at a location within a region at which an RS is defined. If an RMR according to the present invention is used as an IMR, similar to a DMRS, it is necessary to set the RMR to a location of a different RS rather than a CSI-RS. In particular, when an RM resource is set to a symbol in consideration of configuration flexibility of an RMR (e.g., an RM object for a different RS), the symbol is not restricted to a symbol at which a CSI-RS is defined. It may be preferable to cover the entire slot.

Figure 10:
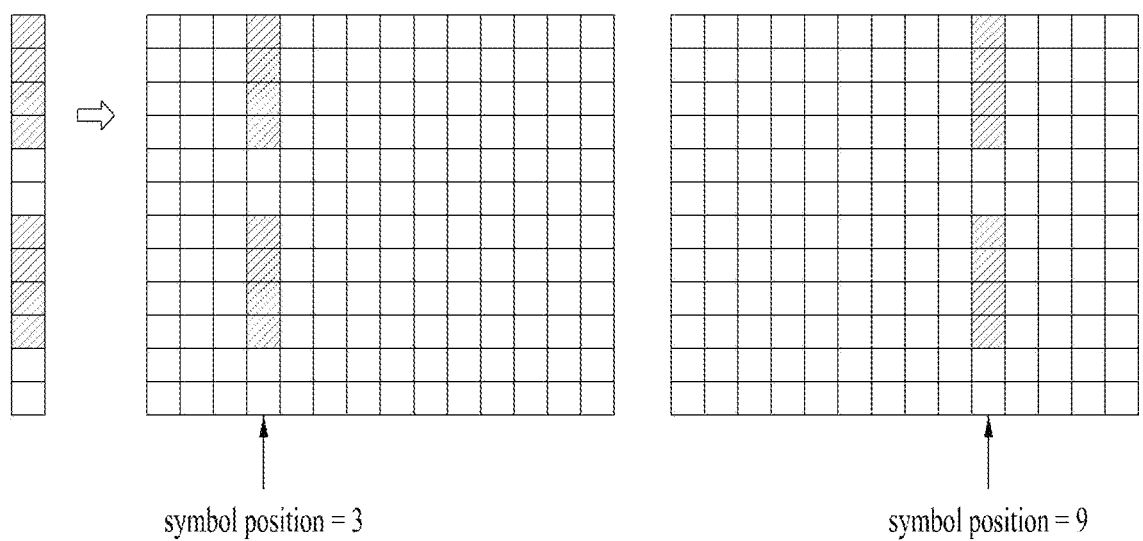
FIG. 10 illustrates an example of a symbol location for an RM pattern.

FIG. 10 illustrates an example of a symbol location for an RM pattern.

If a symbol location configuration is performed on the entire slot, the symbol location configuration can be more simplified. For example, since RM is mainly performed to protect a CSI-RS, the RM can be divided into a case of performing RM resource configuration on a CSI-RS and a case of performing RM resource configuration on a resource rather than the CSI-RS. In particular, a symbol location can be configured by either a 'CSI-RS region' or a 'non-CSI-RS region'. By doing so, a resource region designated by each symbol location may be different and may not be overlapped.

The abovementioned method includes a method for covering characteristics of RSs different from each other. In this case, it may be able to bind several configuration parameters according to a characteristic of an RS to make configuration to be more simplified. In particular, it may set a configuration scheme of a resource to a UE. For example, a 'resource configuration type indication' parameter indicating a scheme to be used among CSI-RS/DMRS/PTRS type can be set to a UE. Each of the resource configuration types can be defined by a set of specific parameters. For example, if the resource configuration type parameter indicates a 'CSI-RS scheme', as mentioned in the foregoing description, it may configure a resource pattern by aggregating 2*1 component RM resources. Since PT-RS is transmitted in the whole of subcarriers within an RB or alternating symbol, if the resource configuration type parameter indicates a PT-RS type, 1 RE is used as a component RM resource and it may set a limit on a region within an RB in which an RMR is configurable. If the resource configuration type parameter indicates a DMRS type, an RE pattern according to a port number can be defined as a component RM resource (e.g., a port number, a front/back loaded DMRS, additional DMRS configuration).

The resource configuration type indication can include parameters described in the following.
  Component RM Resource(s)
    Region (e.g., symbol/subcarrier) within RB at which RMR is defined
    An RMR region may vary depending on an RS for which an RMR is defined.
    Hence, a symbol/subcarrier location can be differently configured according to an RS type such as a CSI-RS candidate position(s), a DMRS candidate position(s), a PTRS position(s), and the like.
  RB-Level Density
    Base density and a configurable density value(s) can be differently configured according to an RS type.
    Region at which RMR pattern is defined (e.g., 1 RB or 2 RBs)

When a parameter is configured according to the 'resource configuration type indication', the parameter can be defined in advance or can be configured via higher layer signaling such as RRC.

More specifically, when an RMR is defined for a PT-RS, it may additionally configure a parameter described in the following.
  Symbol spacing—determines a symbol to which an RMR for a PT-RS is transmitted within a subcarrier. For example, it may consider 1 subcarrier spacing (i.e., a ZP resource for a PT-RS is configured in all symbols within a PDSCH region), 2 subcarrier spacing or 4 subcarrier spacing.

In order to correct inter-symbol phase drift in a slot, it may be able to configure a TRS (tracking RS). The TRS can also be set to a plurality of UEs. In order to precisely measure the phase drift, a method of configuring/signaling rate matching to be performed on the TRS as well is considering. The rate matching of the TRS can also be performed using the aforementioned method.

The method can also be configured for CORESET for transmitting PDSCH. The CORESET corresponds to a resource region in which PDCCH is transmittable. A plurality of UE-specifically configured CORESETs can be set to a UE. A base station informs the UE of a CORESET (to search for PDCCH) to be actually used among a plurality of the CORESETs. An REG (12 REs per symbol) and a search space, which are defined in a wideband/PDCCH region of legacy LTE, are defined in the CORESET.

Since the CORESET is defined for a band equal to or narrower than a bandwidth part, the remaining resource in a symbol at which the CORESET is defined can be used for transmitting PDSCH. Since it is able to transmit PDCCH of a different UE using the resource, it may consider a method of configuring/signaling rate matching to be performed on the resource as well. The rate matching of the CORESET can also be performed using the aforementioned method.

It may also be able to perform rate matching on a synchronization signal (SS) block (SSB) using the aforementioned method. The SS block corresponds to a resource block including a PSS/SSS/PBCH. One or more SS blocks are set to a UE and a base station can designate an SS block to be actually used. When a resource region is occupied by a specific SS block, if the resource region is not used by the resource, the resource region can be used for transmitting PDSCH. It may consider a method of configuring/signaling rate matching to be performed on the resource as well in consideration of a case that the resource is occupied by a different resource. The rate matching of the SS block can also be performed using the aforementioned method.

In particular, the 'resource configuration type indication' can additionally include a target resource and parameters described in the following.
  TRS
    Symbol-level transmission interval within a slot
    TRS subcarrier position
  CORESET
    PDCCH duration (Number of PDCCH symbols)
    RB-level allocation
      RB starting/ending index or RB length
      RB-level bitmap
    CORESET index
  SS block
    SS bock index If such a configuration as 'PDSCH' or 'unrestricted' is defined as a resource configuration type indication, it may consider a method of defining an RMR incapable of being covered by the aforementioned RS configuration method or a method of defining an RMR irrespective of an RS configuration.

In case of an RMR for a PT-RS, it may be able to tie an operation of activating the RMR, i.e., an operation of performing rate matching on the RMR, with DCI signaling instead of aperiodic RMR signaling. For example, when signaling indicating that a UE is performing MU (multi-user) operation or explicit DCI signaling for the MU operation is received, the UE can perform a rate matching operation on the RMR.

When rate matching is performed on a resource that covers a plurality of RS patterns, if a plurality of RMRs having an RS pattern on which the rate matching is to be performed are configured and the aforementioned RM configuration or a link corresponding to the RM configuration is tied with a plurality of the RMRs, it may be able to configure the rate matching to be performed on all RMRs that construct a resource pattern on which rate matching is to be performed. In this case, a resource performing the rate matching is regarded as a union of configured RMRs. In particular, an overlapped resource is configured to perform a rate matching operation one time only.

2. A Resource Pattern is Configured by a Bitmap.

Similar to LTE, it is able to define a resource for performing RM via a bitmap. A predefined grid is defined within an RB (group) and bitmaps are defined as many as the number of grid elements defined in the RB (group). Each bit of a bitmap is tied with each grid element to configure an RMR.

Figure 11:
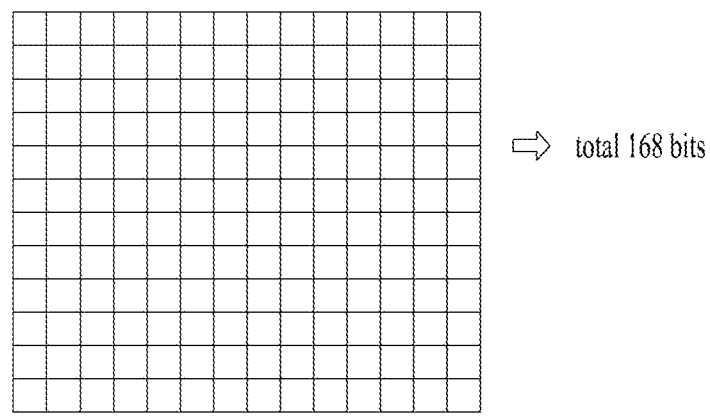
FIG. 11 illustrates a resource grid indicating an RMR or an RMR pattern within 1 RB and the number of bits necessary for expressing the resource grid.

FIG. 11 illustrates a resource grid indicating an RMR or an RMR pattern within 1 RB and the number of bits necessary for expressing the resource grid.

Two or more resource grid element configurations (e.g., a resource grid element size, an RE configuration shape in a resource grid element) can be defined. For example, as shown in FIG. 12, it may be able to determine a resource grid element size from among 1-RE resource grid element and 2-RE resource grid element. In case of supporting an RM operation for an RS such as a PT-RS, since an RS using 1 subcarrier is transmitted in every symbol or alternating symbol in frequency direction, it may use the abovementioned resource grid element size to support the RM operation.

In particular, it may be able to define a different resource grid element configuration according to a region within a slot. For example, since an RM operation in a CSI-RS region is performed to protect a CSI-RS, it is efficient for an RMR to follow a component configuration such as a component resource of a CSI-RS. On the contrary, a DMRS can be transmitted in a different region. A position in which the DMRS is transmitted may vary according to the use of a comb structure or an MU port. In this case, a resource element size of the DMRS may be different from a resource element size of a CSI-RS resource. FIG. 13 illustrates a resource grid element configuration configured in two regions within a slot.

Similar to CSI-RS/DMRS/PDSCH, a resource grid element size can be differently configured according to a target of an RM operation and a location to which the target is set. Similarly, since it is able to perform RM on a specific RE group (e.g., an even-numbered RE for a comb DMRS structure within a symbol), the specific RE group may correspond to 1 bit irrespective of a resource grid element size. The hybrid resource grid can be defined in advance or can be configured via higher layer signaling such as RRC.

A resource grid for RM can be differently defined according to a configuration of the resource grid element size. This is aimed for dividing resource configurations into a high-granularity resource configuration using a limited area and a low-granularity resource configuration that covers a larger area (e.g., a slot). In particular, it is able to cover high resolution/low resolution and a larger area/limited area while maintaining a configuration bit size with the (almost) same length.

For example, if 1-RE RM component resource is defined, each bit of a bitmap is defined in a resource grid shown in FIG. 14 (a). If 2-RE RM component resource is defined, each bit of a bitmap is defined in a resource grid shown in FIG. 14 (b). In FIG. 14, a hatched region corresponds to a candidate region capable of being configured as an RMR.

Figure 15:
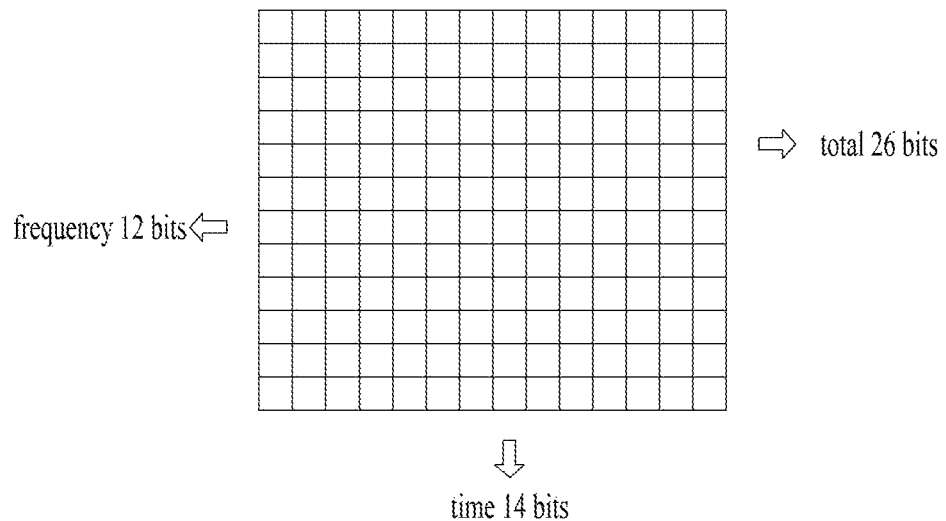
FIG. 15 illustrates a bitmap for a frequency resource region and a bitmap for a time resource region to indicate an RM resource in a slot.

In order to efficiently configure a bitmap, a bitmap (hereinafter, a frequency bitmap) for indicating a frequency resource region is configured by x bits and a bitmap (hereinafter, a time bitmap) for indicating a time resource region can be configured by y bits. In this case, an RE pattern in frequency direction is defined within a symbol using the frequency bitmap and an RM pattern is defined in a symbol designated by the time bitmap within the symbol. For example, as shown in FIG. 15, in order to support the whole of one slot with an RE level, it may support a bitmap of x=12 and y=14. If a frequency bitmap and a time bitmap are transmitted as a single bitmap in a manner of being bundled, among the bitmap of a length of x+y bits in total, x/y bit(s) located at the forepart of the bitmap is comprehended as a frequency/time bitmap and y/x bit(s) located at the rear of the bitmap can be comprehended as a time/frequency bitmap, respectively. The method above can be commonly applied to a current RS structure that an RE pattern within a symbol is identically transmitted from a plurality of symbols. In this case, at least one bit of the time/frequency bitmap corresponds to 1. In other word, at least one symbol/subcarrier should be included in an RM pattern in a manner of being enabled.

If an RMR is restricted to a prescribed region and/or a resource grid element configuration is changed, the x bit and/or the y bit can be reduced in accordance with the condition. For example, if an RMR does not support 2 symbols of a control channel region, y may become 12. In particular, a frequency resource grid element size or a time resource grid element size may become a resource unit (e.g., an RB or a slot) at which an RM pattern is defined (i.e., x=1 or y=1). In this case, a bitmap for corresponding direction may not be defined (i.e., x=1 is redefined by x→0). The abovementioned configuration scheme can be used for RMR configuration of a symbol level or a subcarrier level. In particular, information on whether the configuration scheme corresponds to time direction or frequency direction can be set to a UE.

Figure 16:
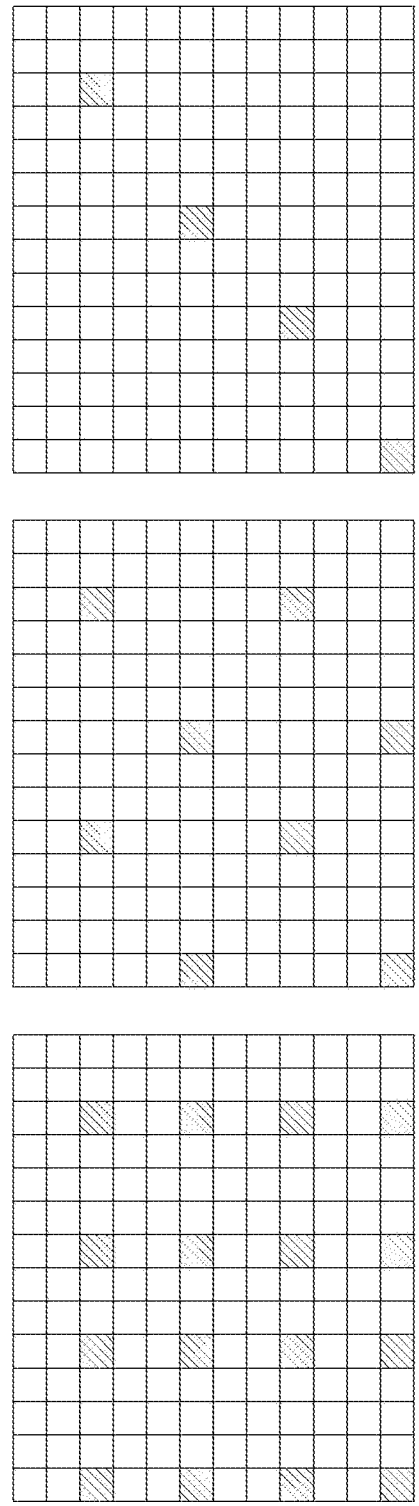
FIG. 16 illustrates RM subset patterns.

When an RM pattern is configured via a time bitmap and a frequency bitmap, the RM pattern can be used under the assumption that an RE pattern within a symbol is identically used in a symbol designated by a bitmap. Hence, in order to use an RM pattern using a part of a corresponding RE only while having the same time bitmap and the same frequency bitmap, it may be able to configure an RM subset pattern. In particular, since a pattern of an RMR for protecting an RS is determined according to a prescribed rule in general, it may be able to configure patterns described in the following as an actual RM subset pattern. FIG. 16 illustrates RM subset patterns described in the following.

(a) Base pattern: An RM pattern is defined by including all REs corresponding to a given time bitmap and a frequency bitmap.

(b) Checker board pattern: An RM pattern is defined by alternating REs with a prescribe period among REs corresponding to a given time bitmap and a frequency bitmap.

A period of alternately selecting an RE can be fixed by a specific number (e.g., 2)
  In this case, it may be able to additionally configure an offset of a checker board pattern.

(c) Diagonal pattern: An RM pattern is defined by a diagonal line among REs corresponding to a given time bitmap and a frequency bitmap.

In this case, it may be able to additionally configure direction (e.g., upper right/bottom right) of a diagonal line.

In particular, although the same time-frequency bitmap is configured, if an RM subset pattern parameter is differently configured, as mentioned in the foregoing description, an actually used pattern can be restricted to an RE group indicated by the RM subset pattern parameter among RE groups designated by the time-frequency bitmap.

When an RE pattern is configured using the method above, it may be able to configure a sort of a repeating pattern. To this end, it may be able to define a repeating resource block and the repeating resource block can be configured to be repeated for prescribed duration (e.g., 1 RB).

Figure 17:
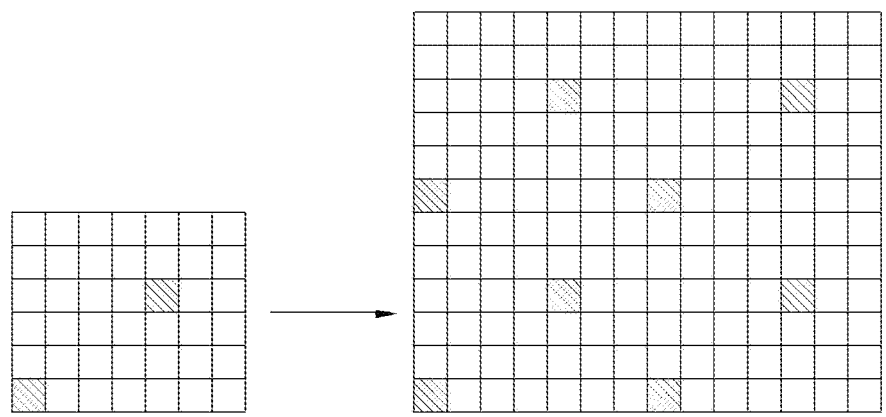
FIG. 17 illustrates an RM resource grid consisting of repetition resource blocks.

To this end, a size of the repeating resource block can be configured. In particular, it is able to configure a size (a) of a time resource and a size (b) of a frequency resource (e.g., the number of symbols and the number of subcarriers) respectively. A signaling unit may vary according to the aforementioned resource granularity (e.g., the resource grid size). It is able to define a resource pattern using the bitmap described in the present invention (and/or a method of making a resource pattern configuration follow a resource configuration scheme of a different RS) within a given time/frequency resource. For example, when 2 symbols are used as a control channel within 1 RB, in other word, in a PDSCH region of 12 symbols/12 subcarriers, if a repeating resource block defined by a=6 symbols/b=6 subcarriers is defined, as shown in FIG. 17, the repeating resource block is repeatedly applied in time/frequency direction.

When a size of an available PDSCH region, i.e., a size of a resource region in which an RMR is configurable corresponds to R, a time/frequency size of the repeating resource block can be defined by $\lfloor R/n \rfloor$ (n is natural number) and the n can be respectively configured by time/frequency direction using a' and b'. For example, the method of FIG. 17 can be defined by parameters of a'=2, b'=2 instead of a=6, b=6. In this case, since a'/b' indicates a repetition count in a corresponding resource, it is able to more clearly indicate a size of the resource. In this case, if a boundary of RB/slot is not matched with a boundary of a repeating resource block at the time of repetition, the repeating resource block is not allocated.

In order to prevent the ambiguity, a' and b' can be configured as a repetition count of the configured repeating resource block irrespective of the configuration of the repeating resource block. Similarly, a position of the repeating resource block can be allocated via the aforementioned method by handling the position of the repeating resource block to be similar to the resource element of the resource configuration described in the present specification. For example, the position of the repeating resource block can be allocated by assuming the repeating resource block as aggregated component RM resources, defining a resource grid element size identical to a size of the repeating resource block, and configuring the position of the repeating resource block with a bitmap according to the resource grid element size.

In particular, the repetition of the resource can be defined except such a region (e.g., a symbol/subcarrier) to which PDSCH is not transmitted as a CSI-RS for managing a beam, a DMRS, and the like.

In a time axis, it may fill a repeating resource block from a rear part of a slot. In case of a fore part of a slot, since a PDSCH region varies due to a control channel, a front-loaded DMRS, and the like, it is preferable to fill the repeating resource block from a rear part of a slot.

As mentioned in the foregoing description, it may consider performing RM on the whole of a certain symbol/subcarrier rather than using a prescribed repetition pattern. In other word, the whole of a symbol/subcarrier configured via a time bitmap/frequency bitmap can be defined as an RMR. This can be configured by comprehending the time bitmap and the frequency bitmap as a union instead of an intersection. To this end, it may be able to inform a UE of information on whether a method of comprehending the bitmap corresponds to a bit-wise or a symbol/subcarrier-wise (i.e., whether the bitmap corresponds to an intersection or a union) via 1-bit indicator. Or, the configuration can be included in the aforementioned 'RM subset pattern' parameter.

The bitmap configuration method can be defined for multiple RBs and multiple slots, respectively. For example, if an RMR pattern is defined for the N number of RBs, a frequency bitmap size may become x (e.g., 12 for the number of subcarriers in an RB)*N bits. If an RMR pattern is defined for the M number of slots, a time bitmap size may become y (e.g., 14 for the number of symbols in a slot)*M bits. The number of RBs/slots can be configured in a manner of being included in an RMR configuration together.

Among the aforementioned methods, according to a hybrid configuration method configuring the whole of RMR, both a high-granularity (i.e., having a big resource grid element size) and a low-granularity (i.e., having a small resource grid element size) are used and a low-granularity indication is configured in a resource region designated by the high-granularity configuration to reduce signaling overhead. To this end, for example, a bitmap for a symbol-level RMR configuration is included in an RMR configuration and a bitmap for a RE-level RMR configuration can be additionally included in the RMR configuration.

On the contrary, according to a hybrid configuration method configuring the whole of RMR, both a high-granularity and a low-granularity are used and a low-granularity indication is configured in a resource region rather than a resource region designated by the high-granularity configuration.

In both cases, in case of a bitmap of the low-granularity indication, a region at which a RE-level bitmap is defined varies according to a bitmap of the high-granularity indication. Hence, a length of a bitmap varies according to high-granularity indication of a preceding RMR configuration.

Two or more indication methods (e.g., granularity size, direction, etc.) can be used for each of the high-granularity indication method and the low-granularity indication method. In this case, an indication method to be used among the two or more indication methods can be included in an RMR configuration. For example, although a hybrid configuration method in symbol direction has been described in the foregoing description for example, since it is able to similarly use the method in frequency direction as well, a configuration indicating whether a bitmap corresponds to time direction or frequency direction can be included in the method.

More specifically, two or more bitmaps can be included in a resource configuration method and it may be able to configure a bitmap to indicate not only a resource granularity of the bitmap but also a purpose of the bitmap.

Resource Granularity
High granularity (e.g., symbol)
Low granularity (e.g., RE)

Purpose

Rate matching is performed on the whole of a resource designated by a bitmap.

A resource on which rate matching is to be actually performed is designated by an additional bitmap in a resource designated by a bitmap.

In this configuration, an additional bitmap is provided to a designated resource only.

For example, when a symbol-level RM configuration bitmap is given, if 'rate matching is performed on the whole of a resource' is configured, the symbol-level RM configuration bitmap is used for the purpose of performing a rate matching operation on the whole of a designated symbol. In this case, an additional bitmap is not provided. On the contrary, 'a resource on which rate matching is to be actually performed is designated via an additional bitmap' is configured, an actual RM resource can be configured in more detail via the aforementioned method within a resource consisting of a symbol group designated by a corresponding symbol.

In the hybrid configuration method, a 'purpose' of the bitmap can be configured in a bitmap indicating high granularity only. In a bitmap indicating low granularity, an operation of performing rate matching on the whole of a designated resource can be fixed. If 'rate matching is performed on the whole of a resource' is configured as a 'purpose', as mentioned in the foregoing description, a bitmap of the low granularity indication can be configured in a region rather than a resource designated by the high granularity indication.

As a method of configuring a bitmap according to a symbol, a bitmap in frequency direction is configured and a symbol index to which the bitmap is applied and/or the number of symbols can be configured. If the number of symbols is configured together, the symbol index can be comprehended as a starting symbol index. The number of symbols may correspond to symbols adjacent to each other in a region (e.g., PDSCH region) in which an RMR is configurable. And, the same method can be applied to a different dimension. For example, a bitmap according to a subcarrier can be configured together with a subcarrier index and/or the number of subframes. If the number of symbols (groups) to which an RMR is to be set using a bitmap is less, the method above can be efficiently used for configuring the RMR.

An RMR designated by a plurality of bitmaps/resources operates as a union of a plurality of the bitmaps/resources (unless there is an additional indication). In other word, it is considered as an overlapped resource performs rate matching on the RMR one time only.

It may be able to define a resource region at which a high-granularity and/or a low-granularity indication method configuration is to be defined according to a PDSCH starting and/or an ending symbol. To this end, the PDSCH starting and/or ending symbol can be configured/signaled to an RMR. In this case, although a separate PDSCH starting and/or ending symbol signaling exists, a UE ignores the signaling and may be able to use the RMR by assuming the PDSCH starting and/or ending symbol defined in the RMR.

An RMR defined in the present invention is applied to a region designated as a PDSCH region only and is not applied to other regions (e.g., PDCCH region, a UL region in a self-contained slot, etc.). For example, when a PDSCH starting and/or ending symbol is signaled, an RMR defined at the outside of a designated region is not used.

Or, it may be able to additionally configure a resource region at which an RMR is to be defined via more dynamic signaling such as MAC/DCI. In particular, a region at which an RMR is to be defined within a PDSCH region can be configured via such a high-granularity indication method as a symbol and/or a subcarrier level.

As mentioned in the foregoing description, similar to a method of using a resource configuration method of a different RS as a resource pattern configuration for rate matching, it may use a different resource configuration method according to a type (e.g., CSI-RS, DMRS, PT-RS) of an RS. To this end, it may indicate 'resource configuration type indication'. Each resource configuration type can differently define the aforementioned characteristics. In this case, it may be able to define such a configuration as 'PDSCH' or 'unrestricted' to freely define an RMR for a region incapable of being covered by the aforementioned RS configuration method or irrespective of the RS configuration. However, if an RMR is freely defined, it may set a limit on a partial parameter (e.g., resource grid element size>1).

3. Hybrid Configuration

If the aforementioned two methods (i.e., a method of using a resource configuration method of a different RS as a resource pattern configuration for rate matching and a method of using a bitmap) are supported at the same time, a method to be used among the two methods can be configured in a corresponding resource configuration. In particular, the resource configuration is integrated with a resource configuration type indication of the method of using a resource configuration of a different RS and can be used as a parameter such as a sort of 'RMR configuration method'.

If the method above is used in periodic/semi-persistent RMR, a time-wise comb configuration can be configured. The time-wise comb configuration defines a slot on which RM is performed with a prescribed pattern between specific periods. For example, in case of a semi-persistent RMR of a period of p, it is able to designate a slot in which an RM operation is used by the RMR within a single period using a bitmap of p-bit. In this case, each bit corresponds to a slot within a period by one to one. For example, if an RM operation is used by a corresponding RMR in a first and a second slot using a configuration of a period of 5 slots and an offset 0 (slot), a bitmap configuration is defined as '11000'. In this case, the RM operation for the RMR is used at slot indexes 0, 1, 5, 6, 10, 11, . . . .

And, it may be able to define RB-level density of an RMR. For example, if density=½ is defined, an RMR can be used in an even-numbered RB or an odd-numbered RM only. In this case, in order to indicate a resource to which an RMR pattern is applied (e.g., even-numbered RB or odd-numbered RB), an RB offset value can be configured.

In particular, when an RMR for a PT-RS is configured, presence/non-presence and a configuration of the PT-RS may vary according to scheduling of a UE. Hence, a parameter for determining a pattern of the PT-RS (e.g., density parameter) can be dynamically transmitted to a UE via DCI.

The abovementioned RM operation can be used for implementing IFDMA (interleaved FDMA) of a beam management CSI-RS. This can be configured in a manner that a NZP CSI-RS designated by an RPF (repetition factor)/offset is transmitted on an n-symbol RMR defined by the aforementioned configuration method.

Method of Signaling Rate Matching

L1/L2 Indication for ZP-CSI-RS

1. 'Rate Matching Setting' Case (Related to FIG. 5)

A rate matching setting including a plurality of links can be set to a UE via higher layer signaling such as RRC.

A set of ZP-CSI-RS patterns to be used is included in each of a plurality of the links. A separate resource setting can be configured via higher layer signaling such as RRC.

In order to have flexibility as much as about dozens ms, it is able to define a ZP-CSI-RS link (group). This scheme is comprehended as being identical to a semi-persistent ZP-CSI-RS configuration. A semi-persistent ZP-CSI-RS performs rate matching on a ZP-CSI-RS RE pattern corresponding to links indicated from a subframe in which enable signaling including an actually used ZP-CSI RS link (group) is received to a subframe in which disable signaling is received.

For the flexibility of a subframe (or slot) unit, a ZP-CSI-RS link (group) to be used as dynamic signaling can be set to a UE via L1 signaling such as DCI. This can be performed in a manner of designating a link to be actually used from among a link group (or a link group sorted via MAC signaling) included in a defined rate matching setting.

In case of an aperiodic ZP-CSI-RS, it may indicate that rate matching is performed on a ZP-CSI-RS RE pattern corresponding to an indicated link in a subframe in which DCI is transmitted.

In case of a semi-persistent ZP-CSI-RS, signaling transmitted via DCI is comprehended as enable/disable signaling. It indicates that rate matching is performed on a ZP-CSI-RS RE pattern corresponding to links indicated from a subframe in which enable signaling is received via DCI to a subframe immediately before a subframe in which disable signaling is received.

2. 'Measurement Setting' Case (Related to FIG. 7)

A 'measurement setting' including a ZP-CSI-RS link can be set to a UE via higher layer signaling such as RRC.

For the flexibility as much as dozens ms, it is able to define a ZP-CSI-RS link (group) to be actually used via MAC signaling. The link can be selected using a scheme identical to a scheme of selecting a link to be actually used for CSI measurement/beam management from a measurement setting.

In this case, the ZP-CSI-RS link (group) can include a link for measuring CSI (e.g., a link including a resource setting and a reporting setting). In this case, the ZP-CSI-RS link is comprehended as a ZP-CSI-RS link according to a resource setting which is designated irrespective of a reporting setting. And, the scheme is comprehended as a scheme identical to a semi-persistent ZP-CSI-RS configuration. The semi-persistent ZP-CSI-RS indicates that rate matching is performed on a ZP-CSI-RS RE pattern corresponding to links indicated from a subframe enable signaling is received to a subframe immediately before a subframe in which disable signaling is received.

For the flexibility of a subframe (or slot) unit, a ZP-CSI-RS link (group) to be used as dynamic signaling can be set to a UE via L1 signaling such as DCI. This can be performed in a manner of designating a link to be actually used from among a link group (or a link group sorted via MAC signaling) included in a defined rate matching setting.

In case of an aperiodic ZP-CSI-RS, it may indicate that rate matching is performed on a ZP-CSI-RS RE pattern corresponding to an indicated link in a subframe in which DCI is transmitted.

In case of a semi-persistent ZP-CSI-RS, signaling transmitted via DCI is comprehended as enable/disable signaling. It indicates that rate matching is performed on a ZP-CSI-RS RE pattern corresponding to links indicated from a subframe in which enable signaling is received via DCI to a subframe immediately before a subframe in which disable signaling is received.

3. 'Resource Setting' Case (Related to FIG. 8)

It may include the aforementioned 1-bit indicator in each resource configuration included in a resource setting.

For the flexibility as much as dozens ms, it is able to include L'-bit ZP-CSI-RS indicator via MAC signaling. Each bit of the L'-bit ZP-CSI-RS indicator is matched with a resource configuration (or a resource of which 1-bit indicator indicates 'rate matching on' among the resource configuration) of the resource setting by one-to-one. Information on whether or not rate matching is performed on an RE pattern corresponding to a resource can be signaled to a UE by toggling a bit by on/off.

The scheme above can be comprehended as a scheme identical to a semi-persistent ZP-CSI-RS configuration. The semi-persistent ZP-CSI-RS indicates that rate matching is performed on a ZP-CSI-RS RE pattern corresponding to links indicated from a subframe in which enable signaling is received to a subframe immediately before a subframe in which disable signaling is received.

For the flexibility of a subframe (or slot) unit, it may be able to transmit 'ZP-CSI-RS indicator' to a UE via L1 signaling such as DCI. This means that it informs a UE of information on whether or not rate matching is performed using an RE pattern corresponding to a ZP-CSI-RS resource (group) configured via higher layer signaling.

In case of an aperiodic ZP-CSI-RS, it may indicate that rate matching is performed on a ZP-CSI-RS RE pattern corresponding to an indicated resource (or a resource group) in a subframe in which DCI is transmitted.

In case of a semi-persistent ZP-CSI-RS, signaling transmitted via DCI is comprehended as enable/disable signaling. It indicates that rate matching is performed on a ZP-CSI-RS RE pattern corresponding to resources (or a resource group) indicated from a subframe in which enable signaling is received via DCI to a subframe immediately before a subframe in which disable signaling is received.

4. Other Configurations

Frequency-Related Configuration

For the flexibility of configuration, a frequency granularity can be set to a UE via L2 signaling such as MAC or L1 signaling such as DCI instead of higher layer signaling.

In this case, the configured frequency granularity is identically applied to the whole of a ZP-CSI-RS pattern. In particular, the frequency granularity is configured by one of a partial band and a wideband using 1-bit indicator.

In this case, the partial band may correspond to a band (or a band set) having a different numerology and/or a different operation scheme (e.g., eMBB, eMTC) similar to an eMBB (enhanced mobile broadband) band.

Or, the partial band may correspond to a configured band group and the band group can be configured via separate signaling via higher layer signaling.

If a separate frequency granularity-related configuration is not provided, a base station and a UE may follow a frequency granularity included in higher layer signaling. Or, in order to reduce signaling overhead, the UE can perform data transmission and reception under the assumption that rate matching is performed on all scheduled bands, Time-Related Configuration For the flexibility of configuration, timing characteristic and/or a period/offset (semi-persistent or periodic) can be set to a UE via L2 signaling such as MAC or L1 signaling such as DCI instead of higher layer signaling.

Since the L1 signaling corresponds to signaling related to allocation/demodulation of PDSCH, it is preferable to transmit the L1 signaling via DL-related UE-specific DCI together with a DL grant (DL scheduling).

In particular, similar to LTE, if a PQI (PDSCH RE mapping and quasi co-location indicator) or DCI signaling similar to the PQI is defined, L1 signaling can be transmitted via the signaling. In this case, if a periodic/semi-persistent RMR is configured and the RMR(S) is configured as an RMR of a PQI, rate matching can be performed on the RMR only when RMR timing designated by the PQI is matched with the timing to which the periodic/semi-persistent RMR is applied. In this case, in case of a semi-persistent RMR, a corresponding rate matching operation can be performed only when the semi-persistent RMR is enabled via a separate signaling/configuration. In case of an aperiodic RMR, rate matching can be performed on the aperiodic RMR at the timing designated by the PQI.

Figure 18:
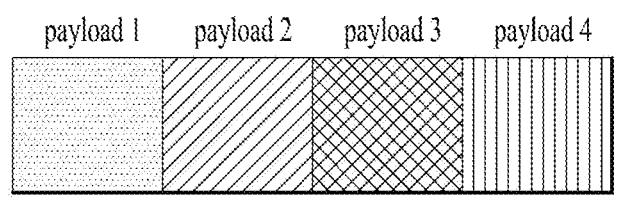
FIGS. 18 to 26 illustrate examples of payload of control information for performing rate matching according to one embodiment of the present invention.

In order to transmit matching signaling for the entire cell or a specific UE group, it may use a sort of cell-specific DCI and/or UE group-specific DCI. In particular, it may be able to transmit the rate matching signaling by including the rate matching signaling in the DCI. FIG. 18 illustrates payload of the cell-specific DCI and/or the UE group-specific DCI.

In particular, it may have a structure that the certain numbers of payloads each of which has a specific length are adjacent to each other. A position of each payload (or a payload index) may have a meaning described in the following.

1. UE

A position of a payload (or a payload index) may correspond to information for a specific UE.

Figure 19:
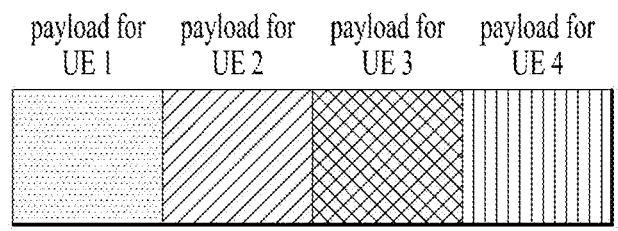

In this case, contents transmitted to a payload may correspond to signaling related to a UE operation configured in advance or configured via RRC/MAC signaling. FIG. 19 illustrates DCI to which a payload for each UE is set. For example, when a payload 1 is tied with a UE 1, signaling transmitted to a position of the payload 1 can signal an operation (e.g., channel measurement, interference measurement, etc.) to be performed in the UE 1 and/or a target resource performing the operation. In particular, if contents indicating 'no RS' are included in signaled information, it may be able to inform a cell/UE group that a corresponding UE does not designate a resource to be used and there is no resource on which rate matching is to be performed by a different UE. The signaling can specify a cell-specific group or a UE-specific group.

In particular, an indication of a UE can be replaced with an indication of a DMRS port and/or an indication of a sequence scrambling parameter (e.g., a specific parameter ID such as a virtual cell-ID, and the like and/or a sequence seed ID such as nSCID and the like). For example, assume that a UE indicates using a DMRS port. In this case, an operation indicated in a payload 1 can indicate that the UE currently uses a DMRS port 7. To this end, it may be able to designate a separate payload for a UE to which a DMRS port is not allocated, i.e., a not scheduled UE.

In particular, a plurality of DMRS ports and/or a plurality of sequence scrambling parameters may use a single payload in consideration of the frequency of using a DMRS port and/or a sequence scrambling parameter. In this case, a state of the payload can be jointly coded by combining a port (and/or a sequence scrambling parameter)(index) with an operation in a port (and/or a sequence scrambling parameter) group.

Figure 20:
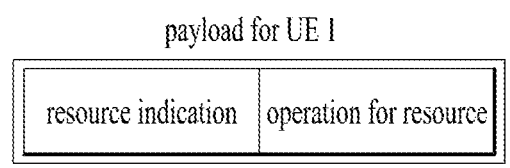

Or, each payload can indicate an operation to be performed by a resource and a UE. FIG. 20 illustrates am example that a payload indicates a resource and a UE operation in the resource. For example, when there is a payload of N bits, the payload indicates a resource to a UE using (N−1) bits and indicates an operation (e.g., channel measurement, interference measurement, etc.) to be performed in the indicated resource using the remaining 1 bit. In this case, a UE set to the payload performs a designated operation in a designated resource and the remaining UEs can perform rate matching on all resources not designated as 'no RS'.

Figure 21:
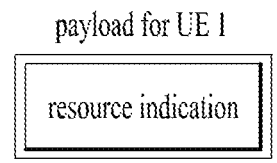

Or, each payload can designate a resource. FIG. 21 illustrates an example that a payload for a UE indicates a resource. A UE performs rate matching on all resources (i.e., a union of resources designated by all payloads) not designated as 'no RS' In particular, the UE performs an operation designated by signaling transmitted to a payload corresponding to the UE on a corresponding resource. The operation for the signaling can be configured via higher layer signaling in advance.

2. Resource

Figure 22:
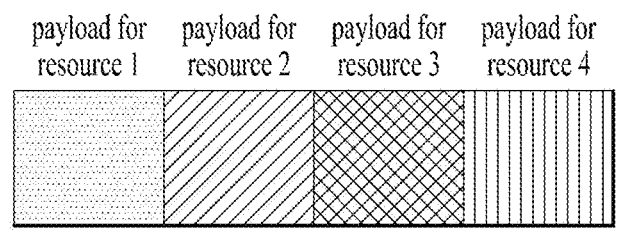

In this case, each position corresponds to a position of a time-frequency (code division multiplexed) resource configured in advance or configured via RRC/MAC signaling. FIG. 22 illustrates an example of DCI including a payload for each resource. In this case, signaling transmitted to each payload may correspond to a UE operation for each resource and/or a UE performing the operation. For example, when a payload 1 is tied with a CSI-RS resource 1, signaling transmitted to a position of the payload 1 may correspond to signaling for an operation (e.g., channel measurement, interference measurement, etc.) to be performed in a configured resource 1. The signaling can specify a cell-specific group or a UE-specific group.

Figure 23:
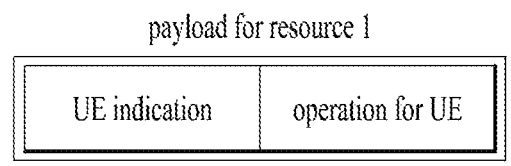

Or, a payload can indicate an operation for a resource tied with the payload and a UE performing the operation. FIG. 23 illustrates a payload for a resource including a UE indication and an operation for the indicated UE. For example, each payload consists of 2 bits and each state of the 2 bits includes 'no measurement', 'channel measurement', interference measurement', and 'channel and interference measurement'. In this case, a UE of each state and a higher layer configuration for an operation are provided to each UE. In this case, each UE can perform rate matching on all resources indicating a state rather than 'no measurement'.

And, 'rate matching only' is added to signaled states to make UEs receiving DCI perform rate matching only on a corresponding resource without a separate operation.

UE signaling can be replaced with DMRS port signaling and/or a sequence scrambling parameter (e.g., a specific parameter ID such as a virtual cell ID and the like and/or a sequence seed ID such as nSCID and the like). For example, when a UE is indicated by a DMRS port, it may indicate 'DMRS port 7' instead of a UE index to indicate that an operation indicated by a corresponding payload corresponds to an operation for a UE currently using 'DMRS port 7'. In this case, if a state indicated by a payload for a non-scheduled UE includes a state indicating 'non-scheduled UE', it may be able to signal an operation for a UE to which a DMRS port is not provided.

3. Operation

Figure 24:
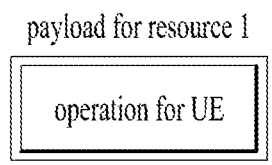

Or, each payload can indicate an operation to be performed by a UE only. FIG. 24 illustrates DCI indicating an operation to be performed by a UE as a payload for a resource. For example, each payload consists of 2 bits and each state includes 'no measurement', 'channel measurement', interference measurement', and 'channel and interference measurement'. When a payload 1 is configured to be tied with an aperiodic CSI-RS resource 1 and the aperiodic CSI-RS resource 1 is allocated to a UE 1 and a UE 2 for channel measurement, if the payload 1 signals 'channel measurement', the UE 1 and the UE 2 perform a channel measurement operation on the CSI-RS resource 1 at the same time. In this case, a higher layer configuration for connecting an operation with a resource is provided to each of the UEs.

And, 'rate matching only' is added to signaled states to make UEs receiving DCI perform rate matching only on a corresponding resource without a separate operation.

Figure 25:
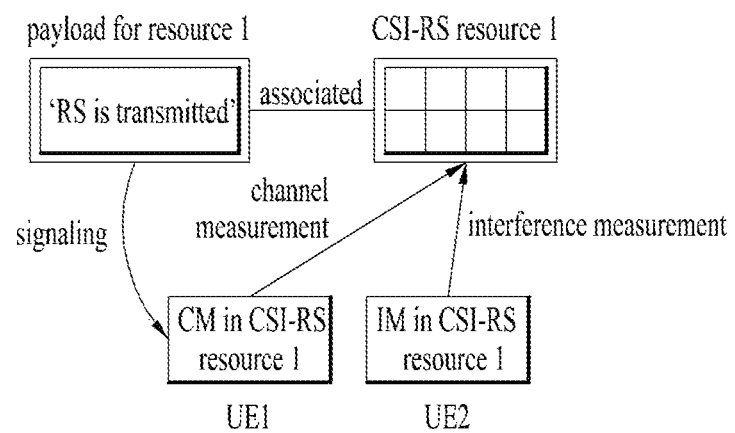

In particular, each payload can inform a UE of transmission/non-transmission of an RS only. In other word, each payload can trigger a resource preset to a UE and an operation in the resource. For example, when a payload 1 is configured to be tied with an aperiodic CSI-RS resource 1, a UE 1 is configured to perform channel measurement on the aperiodic CSI-RS resource 1, and a UE 2 is configured to perform interference measurement on the aperiodic CSI-RS resource 1, if signaling indicating 'measurement' is transmitted to the payload 1, the UE 1 performs channel measurement in the resource and the UE 2 performs interference measurement in the resource. In this case, a connection between a resource and an operation in the resource can be indicated to a UE via higher layer signaling. FIG. 25 illustrates the payload.

4. No Meaning

Figure 26:
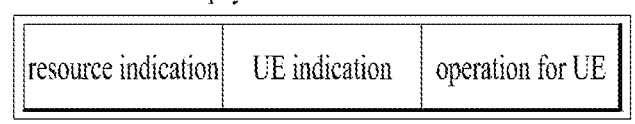

A payload position (or index) has no meaning. A payload can include 3 contents including resource indication, a target UE, and an operation. FIG. 26 illustrates the contents included in a payload. A UE performs rate matching on all resources. If a payload designating the UE exists, the UE performs an operation indicated by the payload in a resource indicated by the payload. In this case, in order to reduce a DCI blind decoding count of the UE, the number of payloads can be determined in advance or can be designated to the UE via higher layer signaling such as RRC and MAC signaling.

In this case, if the resource indication indicates 'no RS', the UE may not read UE indication and an operation for UE. In this case, it may configure and/or signal resource/UE/ operation except RS configuration using the aforementioned scheme. In this case, a UE can operate according to the configured resource/operation based on an RS additionally set to the UE.

The aforementioned RM operation may correspond to an aperiodic RM and a semi-persistent RM (enable/disable). More specifically, in case of the semi-persistent RM, if specific DCI is received, an RM operation is persistently applied to each of instances according to a predetermined period at the corresponding timing and thereafter (until different disable or updating DCI is received) using at least one of the aforementioned methods. RNTI (e.g., SI-RNTI or a separate UE-group-RNTI) for decoding DCI is provided to a UE in advance and the UE may attempt to perform blind decoding on cell-specific DCI or UE-group-specific DCI using the RNTI. Or, semi-persistent RM can be set to a UE via MAC signaling and the RM operation can be restricted to an aperiodic RM only.

UE operation-related signaling can be included in separate UE-specific DCI. In other word, if RM signaling is transmitted or received via cell-specific DCI/UE group-specific DCI, 1-bit signaling of the separate UE-specific DCI recognizes a resource designated by the cell-specific DCI/ UE group-specific DCI as an aperiodic NZP CSI-RS resource and can indicate an operation of performing measurement or an operation of not performing measurement. Moreover, the 1-bit signaling can be combined (jointly encoding) or integrated with aperiodic NZP CSI-RS indication. Similarly, it may designate an RM operation by setting a limit on a size of an aperiodic RM signaling field by 1 bit. And, it may be able to configure to perform RM on a resource designated by the cell-specific DCI/UE group-specific DCI. This operation has a meaning that signaling indicating an RM target resource and signaling indicating whether or not RM is actually performed are separated from each other using cell-specific DCI/UE group-specific DCI and UE-specific DCI, respectively. If an RM target resource designated by the cell-specific DCI/UE group-specific DCI does not exist or is not received, a UE can perform aperiodic reporting on a resource designated for a different reporting (e.g., periodic/semi-persistent reporting).

When multiple slots are scheduled using single DCI, RM designated by the DCI can be identically performed using a scheme designated for a slot scheduled by the DCI. In this case, it is able to indicate RM to the multiple slots without additional signaling overhead. On the contrary, it may perform RM on too many resources. In order to solve the problem, it may be able to designate slot timing at which RM is actually performed via separate signaling. The DCI can designate a slot offset on the basis of the timing at which the DCI is signaled. When RM is designated to multiple timings within a slot group scheduled by single DCI, a base station can designate an RM slot pattern designated via higher layer signaling such as RRC/MAC as DCI. The RM slot pattern corresponds to a set of slots performing RM within the slot group scheduled by the single DCI. The RM slot pattern can be designated by a bit map or a period and/or an offset for full flexibility. The RM slot can be signaled in a manner of being combined with the RM signaling to reduce signaling overhead.

In case of a DMRS, it may consider applying a ZP CSI-RS for the RM to an additional DMRS pattern. It may use an additional DMRS according to UE environment (e.g., Doppler spread according to a speed of a UE, etc.) irrespective of a DMRS pattern shared by all UEs. The additional DMRS is used in a manner of transmitting the additional DMRS to a legacy DMRS. RM for a DMRS pattern can be used to measure interference. And, when multiple users using a different additional DMRS pattern (e.g., a UE using an additional DMRS and a UE not using the additional DMRS) are scheduled, the additional DMRS can be used for cancelling interference in detecting a DMRS. In this case, when the ZP CSI-RS for the RM is used for a DMRS, the DMRS can be restricted to an additional DMRS to reduce signaling overhead.

In FDR (full duplex radio) case, UEs different from each other can perform DL reception/UL transmission in the same slot. In this case, in order to protect an SRS transmitted by a UE performing UL transmission, it may perform RM on an SRS position. The SRS can be transmitted by concentrating power on a partial band for channel measurement performance. In order to perform channel measurement on the whole band (or a configured band) using the SRS transmission scheme, it may consider SRS hopping. It may additionally configure a hopping pattern of an SRS on which RM is to be performed or a parameter determining the hopping pattern in consideration of the SRS hopping.

For an (NZP) CSI-RS enabled/disabled by RRC/MAC signaling, in order to mute transmission/measurement of the CSI-RS at the specific timing, it may transmit CSI-RS muting signaling. In particular, similar to RM performed on PDSCH, a UE does not measure an NZP CSI-RS for a signaled resource (time/frequency) to provide additional flexibility to periodic/semi-persistent NZP CSI-RS via the MAC/RRC configuration and/or IMR (interference measurement resource) via DCI. In particular, when NZP CSI-RS resources are configured in a manner of being overlapped, a plurality of UEs are able to share the resources using the abovementioned method. And, a UE measures a channel of the UE from a CSI-RS resource, exclude the channel from the resource, and uses the remaining channels as interference using the method. In other word, when a resource for measuring a channel and an IMR are configured in a manner of being overlapped, a base station can transmit a different interference hypothesis to a UE at the timing at which CSI-RS/IMR is transmitted using the method.

To this end, it may provide RM signaling corresponding to the overlapped NZP CSI-RS resource position. In this case, although a legacy RM signaling means that a PDSCH symbol is not transmitted in an NZP CSI-RS resource, if the RM signaling indicates or configures a part of the overlapped NZP CSI-RS, it means that a UE does not measure the NZP CSIRS resource. To this end, it may generate a field for RM signaling indicating an NZP CSI-RS resource in DCI.

Or, it may be able to configure a ZP CSI-RS using one of states of aperiodic CSI-RS indication to reduce signaling overhead. In particular, an aperiodic NZP CSI-RS, a periodic/semi-persistent NZP CSI-RS, a ZP-CSI-RS having the same resource, or a resource configuration indicating that a corresponding resource is not measured can be set to one of the states of the aperiodic CSI-RS indication. Hence, if a UE receives the aperiodic CSI-RS indication state, the UE does not use a CMR (channel measurement resource)/IMR transmitted from a corresponding slot for periodically measured and reported CSI. In addition, the UE may not report the CSI or may report non-updated CSI.

Or, if the UE receives aperiodic CSI-RS indication, the UE can be configured not to perform measurement on a different CMR/IMR transmitted from a corresponding slot or a CMR/IMR to which a higher layer configuration is transmitted in advance.

In particular, it may perform RM on a part of the NZP CSI-RS only. This is because it is not necessary for transmission of the NZP CSI-RS to have high density to measure interference only and it is necessary to enhance channel estimation performance of a UE performing channel estimation in a collision resource.

Moreover, in the description mentioned earlier in FIGS. 5 to 8, if a single reporting setting is restricted to be tied with a single link, it is apparent that a scheme of indicating a reporting setting is identical to the signaling scheme of the 'link'. And, the aforementioned ZP CSI-RS corresponds to a resource for performing RM. As mentioned in the foregoing description, the resource may include a different type of an RS (or an RS resource) such as a DMRS in addition to a NZP CSI-RS and a ZP CSI-RS. Hence, it may consider a different name (e.g., RM resource (RMR) instead of the ZP CSI-RS. In this case, it is apparent that the aforementioned operation is identically applied.

A corresponding RMR may not be applied to a PDSCH of a different type (e.g., a broadcast PDSCH). Since the broadcast PDSCH includes information essential for a system operation, it is preferable to guarantee a coding rate of a corresponding resource. And, since it is able to configure/indicate transmission of the broadcast PDSCH using DCI different from DCI for allocating a PDSCH resource, if RMR signaling transmitted via RMR UE-specific DCI is lost, it may be difficult to decode the broadcast PDSCH. Consequently, latency may increase. Hence, it may not perform rate matching on an RMR configured for the broadcast PDSCH. Or, although a partial coding rate is lost, it may perform puncturing on the RMR to prevent a different resource from being measured.

When ZP CSI-RS is signaled using DCI (i.e., aperiodic ZP CSI-RS) and the RM scheme is used, if it fails to receive DCI, it is unable to decode the whole of a subframe. Hence, a UE and a base station can promise that the information is used not for RM bur for indicating an RE puncturing pattern of data not. In particular, when the base station maps an RE of data, the base station perform RE mapping under the assumption that data is transmitted in a ZP CSI-RS RE as well and does not transmit the data mapped in the RE at the final transmission timing. And, a UE performs decoding on the data by assuming the transmission operation of the base station. Consequently, the UE assumes that noise and a dummy value are included in a muting RE instead of data. When channel decoding is performed in the muting RE, the UE does not perform LLR (log-likelihood ratio) calculation in the muting RE. Or, the UE can perform the LLR calculation under the assumption that a data bit 0 and a data bit 1 have the same probability. In this case, additional signaling is not necessary in a system. Although a UE fails to receive DCI, the UE may have a transmission success probability of a certain level with the help of channel coding.

In particular, when data is transmitted and received without receiving DCI (e.g., semi-persistent scheduling (SPS)), if blind decoding is performed on DCI in every subframe for an RM operation using a ZP CSI-RS (i.e., aperiodic ZP CSI-RS), it is not preferable in terms of battery consumption of a UE. In particular, when data is transmitted and received using an SPS, RM signaling provided by DCI among the ZP CSI-RS pattern can be comprehended as a puncturing pattern instead of the RM pattern by a base station and a UE. For example, when SPS data is transmitted to a specific UE, if a base station intends to transmit data using an aperiodic ZP CSI-RS by an aperiodic CSI-RS and the like, the base statin performs data allocation under the assumption that a ZP CSI-RS RE pattern corresponds to an RE muting pattern for the UE receiving the SPS data. In this case, the base station does not transmit additional ZP CSI-RS indication-related DCI. In this case, a ZP CSI-RS configured via higher layer signaling such as RRC or MAC can perform an RM operation. In other word, a base station transmitting SPS data and a UE receiving the SPS data may operate under the assumption that RM is performed on a predetermined periodic (and/or a semi-persistent) ZP CSI-RS in the middle of transmitting and receiving the SPS data and an aperiodic ZP CSI-RS is not indicated by the base station.

An RMR described in the present specification can be differently configured according to an (analog and/or digital) transmission beam of a base station. For example, as shown in FIG. 18, when an RAM configuration is provided for a UE 2 using a beam 1 to transmit PDSCH, it is necessary to configure an RMR in the beam 1 to protect an NZP CSI-RS transmitted using a beam 3. However, it is not necessary to set the RMR to the UE 1 that uses a beam 2 not affecting transmission of the beam 3. If the UE 2 moves to a position of the UE 1 and uses the beam 2 instead of the beam 1 to transmit PDSCH, it is not preferable to use the same RMR for PDSCH RM of the UE 2. In legacy LTE environment, since switching of a transmission (or reception) beam is semi-statically performed, a ZP CSI-RS, which is configured via RRC configuration, is sufficient for the switching. However, a legacy scheme may be not appropriate for New RAT considering a more dynamic beam change.

Hence, a plurality of RMRs are set to a UE in a manner of being associated with a transmission beam of a base station. If a specific transmission beam is used to transmit PDSCH, the base station/UE can be configured to perform RM on an RMR associated with the transmission beam to transmit and receive data. A transmission beam can be associated with an RMR using methods described in the following.

1. RMR is Associated with Transmission Beam Index
    If a transmission beam and a transmission beam index according to the transmission beam are commonly defined/configured between a base station and a UE, a transmission beam index is set to each RMR. If a transmission beam having a specific index is used to transmit PDSCH, it may be able to perform PDSCH RM using an RMR corresponding to the transmission beam index. On the contrary, it may be able to configure a different RMR according to a transmission beam index. In this case, it may be able to inform a UE of a beam index to be currently used via L1/L2 signaling.
    Similarly, if a link of a pair of beams of a transmission beam and a reception beam is defined, a transmission beam index can be replaced with an index of the link of the pair of beams.

2. RMR is Associated with CRI (CSI-RS Resource Indicator)
    If a transmission beam is associated with an NZP CSI-RS via a parameter such as QCL (quasi-co-located), a transmission beam of the "1. Association with transmission beam index" case can be replaced with the NZP CSI-RS. In particular, not a 'transmission beam' but an NZP CSI-RS is associated with each RMR. The NZP CSI-RS corresponds to an RS to which a transmission beam is reflected in beam management and the like. In particular, the NZP CSI-RS can be used in a manner of being associated with a CRI reported in the beam management stage. The method above can more UE-transparently operate compared to a method of explicitly associating with a transmission beam.
    In case of using a QCL parameter, the QCL parameter can be restricted to a spatial QCL part (i.e., an arrival angle and/or angle spread).

In the methods above, it is not necessary to map a transmission beam (or a parameter corresponding to the beam) and an RMR by one-to-one. In particular, one RMR can be associated with beams different from each other at the same time and one transmission beam can be associated with a plurality of RMRs. And, instead of a transmission beam, a transmission beam group (e.g., cell-center beam group/cell-edge beam group) for an RMR can be defined. In particular, an RMR can be configured according to a transmission beam group for the RMR. The abovementioned configuration can be included in a resource setting of an RMR. In an RM setting and/or a measurement setting, it may be able to define links different from each other (i.e., a plurality of RMR groups) according to a beam index or a parameter related to the beam index in consideration of additional MAC/DCI signaling. And, association between a transmission beam and an RMR can be included in RRC/MAC signaling.

If multiple transmission beams are used for transmitting data in a slot, a UE may apply a different RMR in a unit (e.g., symbol) of changing a transmission beam in the slot. In other word, if a transmission beam for transmitting data is changed in every 7 symbols in a slot, an RMR pattern used in the first 7 symbols may be different from an RMR pattern used in the second 7 symbols. Or, in order to reduce complexity, an RMR corresponding to a union of all RMRs corresponding to multiple transmission beams for transmitting data can be used as an RMR of a corresponding slot.

According to the method above, since additional dynamic signaling is not used, the method can be usefully utilized for such a configuration as a periodic/semi-persistent RMR having latency longer than DCI. In aperiodic/semi-persistent RMR, an RMR candidate capable of being designated via signaling can be determined according to a transmission beam (or transmission beam group). In this case, transmission beam-related information can be included in signaling of the RMR candidate. If the number of RMR candidates is considerably less, a method of associating the RMR candidate with a transmission beam is omitted. Instead, a base station may select/transmit an appropriate RMR via MAC and/or DCI signaling.

Figure 27:
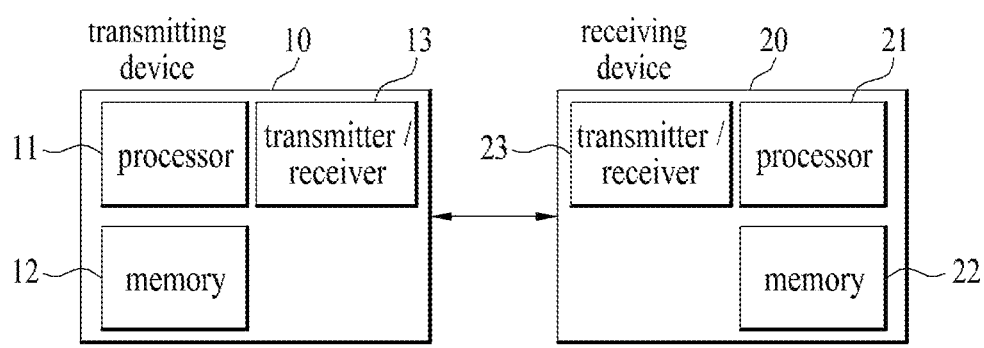
FIG. 27 is a block diagram of a device for implementing embodiment(s) of the present invention.

FIG. 27 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

As an embodiment, a terminal for decoding a downlink signal in a wireless communication system is proposed. The terminal includes a transmitter and a receiver, and a processor that controls the transmitter and the receiver, the processor that controls the receiver to receive rate matching pattern information indicating a rate matching resource having a repetition period from a base station, and decodes a downlink shared channel using the rate matching pattern information.

Further, the rate matching pattern information may include a first bitmap indicating a frequency resource region, a second bitmap indicating a time resource region, and a third bitmap indicating one or more time units to which a rate matching pattern indicated by the first bitmap and the second bitmap is configured among a plurality of time units within the repetition period.

Further, the terminal further performs rate matching on the rate matching resource.

Further, the second bitmap may indicate each of consecutive symbols within a predetermined resource unit.

The rate matching pattern information may be used only in a region for the downlink shared channel.

Further, the region for the downlink shared channel may be configured by a signal indicating a starting symbol of the downlink shared channel or an ending symbol of the downlink shared channel.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

What is claimed is:

1. A method of decoding a downlink signal in a wireless communication system, the method performed by a user equipment (UE), the method comprising:
   receiving, from a base station (BS), rate-matching pattern information indicating a rate-matching resource having a repetition period; and
   decoding a downlink shared channel using the rate-matching pattern information,
   wherein the rate-matching pattern information includes a first bitmap indicating a frequency resource region, a second bitmap indicating a time resource region, and a third bitmap indicating one or more time units in which a rate-matching resource indicated by the first bitmap and the second bitmap is configured among a plurality of time units within the repetition period.

2. The method according to claim 1, further comprising performing a rate matching for the rate-matching resource.

3. The method according to claim 1, wherein the second bitmap indicates each of contiguous symbols in a predetermined resource unit.

4. The method according to claim 1, wherein the rate-matching pattern information is used only in a region for the downlink shared channel.

5. The method according to claim 4, wherein the region for the downlink shared channel is configured by a signal indicating a starting or ending symbol of the downlink shared channel.

6. A method of transmitting a downlink signal in a wireless communication system, the method performed by a base station (BS), the method comprising:
   transmitting, to a user equipment (UE), rate-matching pattern information indicating a rate-matching resource having a repetition period;
   performing resource element mapping for a downlink shared channel based on the rate-matching pattern information; and transmitting the downlink shared channel,
wherein the rate-matching pattern information includes a first bitmap indicating a frequency resource region, a second bitmap indicating a time resource region, and a third bitmap indicating one or more time units in which a rate-matching resource indicated by the first bitmap and the second bitmap is configured among a plurality of time units within the repetition period.

7. The method according to claim 6, wherein a rate matching is performed for the rate-matching resource.

8. The method according to claim 6, wherein the second bitmap indicates each of contiguous symbols in a predetermined resource unit.

9. The method according to claim 6, wherein the rate-matching pattern information is used only in a region for the downlink shared channel.

10. The method according to claim 9, wherein the region for the downlink shared channel is configured by a signal indicating a starting or ending symbol of the downlink shared channel.

11. A user equipment (UE) for decoding a downlink signal in a wireless communication system, the UE comprising:
a transmitter and a receiver; and
a processor configured to control the transmitter and the receiver,
wherein the processor is configured to receive rate-matching pattern information indicating a rate-matching resource having a repetition period from a base station (BS) through the receiver, and to decode a downlink shared channel using the rate-matching pattern information, and
wherein the rate-matching pattern information includes a first bitmap indicating a frequency resource region, a second bitmap indicating a time resource region, and a third bitmap indicating one or more time units in which a rate-matching resource indicated by the first bitmap and the second bitmap is configured among a plurality of time units within the repetition period.

12. A base station (BS) for transmitting a downlink signal in a wireless communication system, the BS comprising:
a transmitter and a receiver; and
a processor configured to control the transmitter and the receiver,
wherein the processor is configured to transmit, to a user equipment (UE), rate-matching pattern information indicating a rate-matching resource having a repetition period, to perform resource element mapping for a downlink shared channel based on the rate-matching pattern information, and to transmit the downlink shared channel, and
wherein the rate-matching pattern information includes a first bitmap indicating a frequency resource region, a second bitmap indicating a time resource region, and a third bitmap indicating one or more time units in which a rate-matching resource indicated by the first bitmap and the second bitmap is configured among a plurality of time units within the repetition period.

\* \* \* \* \*